US012521638B2

(12) United States Patent
Zheng

(10) Patent No.: US 12,521,638 B2
(45) Date of Patent: Jan. 13, 2026

(54) METHODS AND APPARATUSES FOR CREATING TEAM IN VIRTUAL SCENE AND JOINING TEAM IN VIRTUAL SCENE

(71) Applicant: Tencent Technology (Shenzhen) Company Limited, Guangdong (CN)

(72) Inventor: Shuyuan Zheng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 350 days.

(21) Appl. No.: 18/140,044

(22) Filed: Apr. 27, 2023

(65) Prior Publication Data

US 2023/0364516 A1 Nov. 16, 2023

Related U.S. Application Data

(63) Continuation of application No. PCT/CN2022/111672, filed on Aug. 11, 2022.

(30) Foreign Application Priority Data

Aug. 31, 2021 (CN) ........................ 202111015882.5

(51) Int. Cl.
*A63F 13/795* (2014.01)
*A63F 13/533* (2014.01)

(52) U.S. Cl.
CPC .......... *A63F 13/795* (2014.09); *A63F 13/533* (2014.09)

(58) Field of Classification Search
CPC ...... A63F 13/795; A63F 13/533; A63F 13/58; A63F 13/86; A63F 13/828; A63F 13/42; A63F 13/52; A63F 13/55; A63F 2300/308
USPC ............................................................ 463/42
See application file for complete search history.

(56) References Cited

U.S. PATENT DOCUMENTS

| | | | | |
|---|---|---|---|---|
| 2002/0160824 | A1 | 10/2002 | Goto et al. | |
| 2006/0080279 | A1* | 4/2006 | Jones | G06Q 10/06 |
| 2025/0119450 | A1* | 4/2025 | Ackerman | H04L 41/22 |

FOREIGN PATENT DOCUMENTS

| | | | |
|---|---|---|---|
| CN | 107930127 | 4/2018 | |
| CN | 108970124 | 12/2018 | |
| CN | 110266507 | 9/2019 | |
| CN | 110755850 A | 2/2020 | |
| CN | 111760296 | 10/2020 | |
| CN | 111760296 A * | 10/2020 | A63F 13/795 |
| CN | 112363649 | 2/2021 | |
| CN | 113663325 | 11/2021 | |

(Continued)

OTHER PUBLICATIONS

International Search Report issued Sep. 27, 2022 in International (PCT) Application No. PCT/CN2022/111672.

(Continued)

*Primary Examiner* — Michael A Cuff
(74) *Attorney, Agent, or Firm* — Crowell & Moring LLP

(57) ABSTRACT

The present disclosure provides a method and apparatus for creating a team in the virtual scene. The method includes: presenting at least one virtual resource for selection in a team creation interface in response to a creation instruction for a target team in a virtual scene; determining, in response to a selection operation for a target virtual resource, the target virtual resource as a joining condition for joining the target team; and creating the target team in response to a confirmation instruction triggered based on the joining condition.

19 Claims, 16 Drawing Sheets

(56) References Cited

FOREIGN PATENT DOCUMENTS

| | | | |
|---|---|---|---|
| JP | 2002-325975 | A | 11/2002 |
| JP | 2008-113782 | A | 5/2008 |
| JP | 2016-150207 | A | 8/2016 |
| JP | 2020-022892 | A | 2/2020 |
| JP | 2020-065733 | A | 4/2020 |
| JP | 2020-157147 | A | 10/2020 |
| JP | 2021-090699 | A | 6/2021 |
| KR | 10-1229728 | B1 | 3/2013 |
| KR | 10-1963858 | B1 | 4/2019 |

OTHER PUBLICATIONS

Korean-language Office Action issued in Korean Application No. 10-2023-7035923 dated Apr. 21, 2025 with English translation (24 pages).

Office action issued in Japanese application No. 2023-572630, dated Sep. 9, 2024, 12 pages (with English translation).

* cited by examiner

METHODS AND APPARATUSES FOR CREATING TEAM IN VIRTUAL SCENE AND JOINING TEAM IN VIRTUAL SCENE

RELATED APPLICATION

This application is a continuation application of PCT Patent Application No. PCT/CN2022/111672, filed on Aug. 11, 2022, which claims priority to Chinese Patent Application No. 202111015882.5 filed on Aug. 31, 2021, wherein the content of the above-referenced applications is incorporated herein by reference in its entirety.

FIELD OF THE TECHNOLOGY

This disclosure relates to the technical field of virtualization and human-computer interaction, in particular, to a method and apparatus for creating a team in a virtual scene, a method and apparatus for joining a team in a virtual scene, a device, a medium, and a program product.

BACKGROUND OF THE DISCLOSURE

With the development of computer technology, electronic devices can implement richer and more vivid virtual scenes. A virtual scene refers to a digital scene drawn by a computer through digital communication technology. Users can obtain a full virtualization feeling (such as virtual reality) or a partial virtualization feeling (such as augmented reality) in terms of vision and hearing in the virtual scene. Moreover, it is possible to control an interactive battle between virtual objects of one team and virtual objects of another team in the virtual scene, to obtain feedback.

In related art, when creating a team for interaction in a virtual scene, team-up needs to be implemented by adding friends in a virtual scene client. The joining condition for the formed team is fixed and single, for example, transmitting a joining request and waiting for approval to join, and a team creator cannot customize the joining condition. Moreover, the entire team-up process is complicated, and the efficiency of human-computer interaction is low.

SUMMARY

Embodiments of this disclosure provide a method and apparatus for creating a team in a virtual scene, a method and apparatus for joining a team in a virtual scene, an electronic device, a computer-readable storage medium, and a computer program product, capable of implementing team-up in a virtual scene, improving the efficiency of human-computer interaction, enabling more diverse team joining conditions to be set, and achieving simple implementation and high processing efficiency.

Technical solutions in the embodiments of this disclosure are implemented as follows.

The embodiments of this disclosure provide a method for creating a team in a virtual scene, including:

- presenting at least one virtual resource for selection in a team creation interface in response to a creation instruction for a target team in a virtual scene;
- determining, in response to a selection operation for a target virtual resource, the target virtual resource as a joining condition for joining the target team, the joining condition being for indicating that upon receiving a transmitted target virtual resource, a corresponding transmitting object being determined to be a member of the target team; and

- creating the target team in response to a confirmation instruction triggered based on the joining condition.

The embodiments of this disclosure further provide a method for joining a team in a virtual scene, including:

- presenting a joining function entry of a target team in a virtual scene, and presenting a joining condition for the target team, the joining condition being for indicating that upon transmitting a target virtual resource to a creation object of the target team, a corresponding transmitting object being determined to be a member of the target team; and
- transmitting the target virtual resource and joining the target team in response to a trigger operation for the joining function entry.

The embodiments of this disclosure further provide a computer-readable storage medium, storing an executable program, the executable program being executed by a processor to implement the method according to the embodiments of this disclosure.

The embodiments of this disclosure have the following beneficial effects.

When receiving a creation instruction for a target team in a virtual scene, at least one virtual resource for selection is presented in a team creation interface; in response to a selection operation for a target virtual resource, the target virtual resource is determined as a joining condition for joining the target team, the joining condition being used for indicating that upon receiving of a transmitted target virtual resource, it is determined that a corresponding transmitting object is a member of the target team; and the target team is created when a confirmation instruction triggered based on the target virtual resource is received. In this way, team-up in the virtual scene can be implemented without adding friends in the virtual scene, thereby improving the efficiency of human-computer interaction and saving processing resources. Moreover, the team creator can customize the joining condition for joining the target team based on the presented virtual resources for selection, that is, only when the target virtual resource set by the team creator is transmitted, the target team can be joined. Thus, more diverse team joining conditions can be set, and simple implementation and high processing efficiency are achieved.

DESCRIPTION OF EMBODIMENTS

To make the objectives, technical solutions, and advantages of this disclosure clearer, the following describes this disclosure in detail with reference to the accompanying drawings. The described embodiments are not to be considered as a limitation to this disclosure. All other embodiments obtained by a person of ordinary skill in the art without creative efforts shall fall within the scope of protection of this disclosure.

In the following description, the term "some embodiments" describes subsets of all possible embodiments, but it may be understood that "some embodiments" may be the same subset or different subsets of all the possible embodiments, and can be combined with each other without conflict.

In the following description, the term "first/second/third" involved is only used for distinguishing similar objects and does not represent a specific order of objects. Understandably, "first/second/third" may be interchanged with a specific order or priority if permitted, so that embodiments of this disclosure described here may be implemented in an order other than that illustrated or described here.

Unless otherwise specified, all technical and scientific terms used herein have the same meanings as commonly understood by those skilled in the technical field that the disclosure relates to. The terms used herein are only used for describing the purpose of embodiments of this disclosure, not intended to limit this disclosure.

Before the embodiments of this disclosure are described in detail, a description is made on nouns and terms in the embodiments of this disclosure, and the nouns and terms in the embodiments of this disclosure are applicable to the following explanations.

1) Client: an application running in a terminal for providing various services, such as a game client, an instant messaging client, and a video playback client.

2) In response to: used for representing a condition or state on which an operation performed depends. If the condition or state is satisfied, one or more operations performed may be in real time or with a set delay. Unless otherwise specified, there is no restriction on the order in which a plurality of operations are performed.

Figure 1:
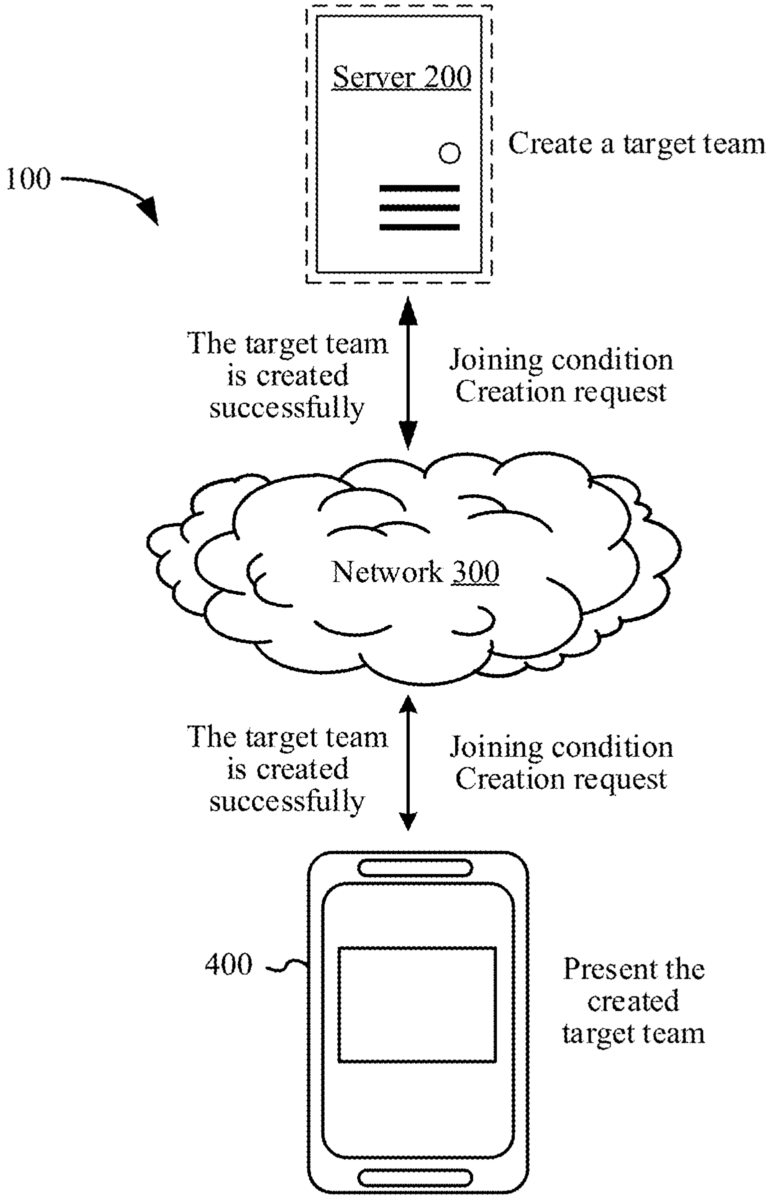
FIG. 1 is a schematic architectural diagram of a system 100 for creating a team in a virtual scene according to embodiments of this disclosure.

Based on the above explanations of nouns and terms involved in the embodiments of this disclosure, a system for creating a team in a virtual scene provided by the embodiments of this disclosure is described below. With reference to FIG. 1, FIG. 1 is a schematic architectural diagram of a system 100 for creating a team in a virtual scene according to embodiments of this disclosure. In order to support an exemplary application, a terminal 400 is connected to a server 200 through a network 300. The network 300 may be a wide area network or a local area network, or a combination thereof. Data transmission may be achieved using wireless or wired links.

The terminal 400 is configured to: in response to a creation instruction for a target team in a virtual scene, present a team creation interface corresponding to the target team, and present at least one virtual resource for selection in the team creation interface; and determine, in response to a selection operation for a target virtual resource in the at least one virtual resource, the target virtual resource as a joining condition for joining the target team, and transmit the determined joining condition to the server 200, the joining condition being used for indicating that upon receiving of a transmitted target virtual resource, it is determined that a corresponding transmitting object is a member of the target team.

The server 200 is configured to receive the joining condition for the target team transmitted by the terminal 400.

The terminal 400 is further configured to transmit a creation request for the target team to the server 200 in response to a confirmation instruction triggered based on the target virtual resource.

The server 200 is further configured to receive the creation request for the target team transmitted by the terminal 400, create the target team, and return a target team creation success notification message.

The terminal 400 is configured to receive the target team creation success notification message returned by the server 200, and present the created target team for members in the target team to interact in the virtual scene.

In practical applications, the server 200 may be an independent physical server, or may be a server cluster or a distributed system composed of multiple physical servers, or may be a cloud server that provides a basic cloud computing service such as a cloud service, a cloud database, cloud computing, a cloud function, cloud storage, a network service, cloud communication, a middleware service, a domain name service, a security service, a Content Delivery Network (CDN), and a big data and artificial intelligence platform. The terminal 400 may be a smartphone, a tablet computer, a laptop computer, a desktop computer, a smart speaker, a smart television, a smart watch, or the like, but is not limited thereto. The terminal 400 may be directly or indirectly connected to the server 200 through wired or wireless communications, which is not limited in this disclosure.

Figure 2:
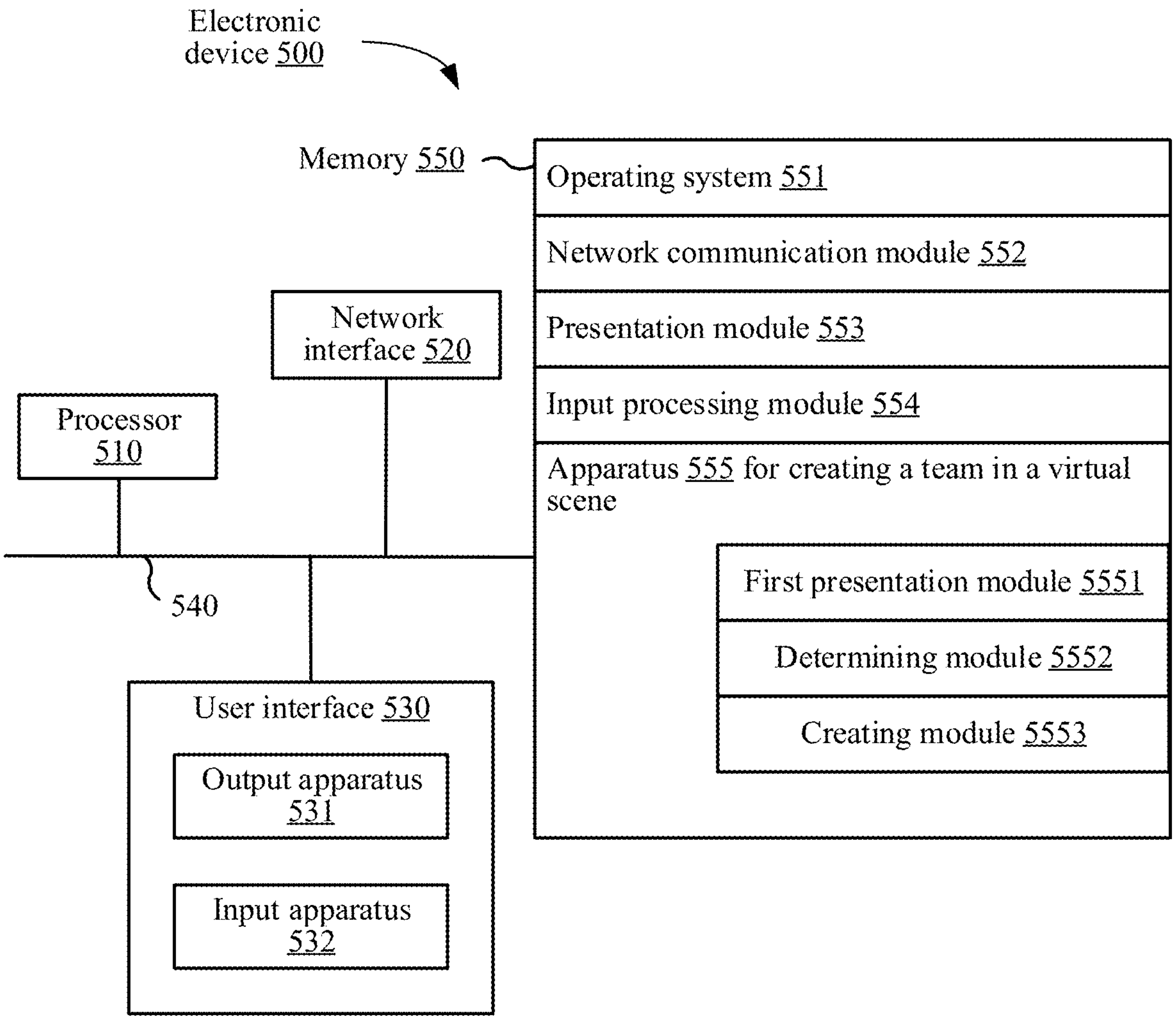
FIG. 2 is a schematic structural diagram of an electronic device 500 for implementing a method for creating a team in a virtual scene according to embodiments of this disclosure.

With reference to FIG. 2, FIG. 2 is a schematic structural diagram of an electronic device 500 for implementing a method for creating a team in a virtual scene according to embodiments of this disclosure. In practical applications, the electronic device 500 may be the server or terminal shown in FIG. 1. Taking the electronic device 500 being the terminal shown in FIG. 1 as an example, the electronic device for implementing a method for creating a team in a virtual scene according to the embodiments of this disclosure is described. The electronic device 500 provided in the embodiments of this disclosure includes at least one processor 510, a memory 550, at least one network interface 520, and a user interface 530. Components in the electronic device 500 are coupled together by a bus system 540. It may be understood that, the bus system 540 is configured to implement connection and communication between the components. In addition to a data bus, the bus system 540 further includes a power bus, a control bus, and a state signal bus. However, for clarity of illustration, various buses are labeled as the bus system 540 in FIG. 2.

The processor 510 may be an integrated circuit chip with signal processing capabilities, such as a general-purpose processor, a Digital Signal Processor (DSP), or other programmable logic devices, discrete gate or transistor logic devices, discrete hardware components, or the like. The general-purpose processor may be a microprocessor or any conventional processor, etc.

The user interface 530 includes one or more output apparatuses 531 that enable presentation of media content, including one or more loudspeakers and/or one or more visual display screens. The user interface 530 further includes one or more input apparatuses 532, including user interface components that facilitate user input, such as a keyboard, a mouse, a microphone, a touch display screen, a camera, other input buttons and controls.

The memory 550 may be removable, non-removable, or a combination thereof. An exemplary hardware device includes a solid-state memory, a hard disk drive, an optical disk drive, etc. The memory 550 may include one or more storage devices located physically away from the processor 510.

The memory 550 includes a volatile memory or a non-transitory memory, and may also include both volatile and non-transitory memories. The non-transitory memory may be a Read Only Memory (ROM), and the volatile memory may be a Random Access Memory (RAM). The memory 550 described in the embodiments of this disclosure is intended to include any suitable type of memories.

In some embodiments, an apparatus for creating a team in a virtual scene according to the embodiments of this disclosure may be implemented by software. FIG. 2 shows an apparatus 555 for creating a team in a virtual scene stored in the memory 550. The apparatus may be software in the form of a program and plug-in, and includes the following software modules: a first presentation module 5551, a determining module 5552, and a creating module 5553. The modules are logical, and therefore can be combined or split arbitrarily according to the functions to be implemented. The functions of the modules will be described below.

Here, the term "module" (and other similar terms such as unit, submodule, etc.) refers to computing software, firmware, hardware, and/or various combinations thereof. At a minimum, however, modules are not to be interpreted as software that is not implemented on hardware, firmware, or recorded on a non-transitory processor readable recordable storage medium. Indeed "module" is to be interpreted to include at least some physical, non-transitory hardware such as a part of a processor, circuitry, or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry on the same or different integrated circuit.

In some other embodiments, the apparatus for creating a team in a virtual scene according to the embodiments of this disclosure may be implemented by combining software and hardware. As an example, the apparatus for creating a team in a virtual scene according to the embodiments of this disclosure may be a processor in the form of a hardware decoding processor, which is programmed to execute the method for creating a team in a virtual scene according to the embodiments of this disclosure. For example, the processor in the form of a hardware decoding processor may be one or more of an Application Specific Integrated Circuit (ASIC), a DSP, a Programmable Logic Device (PLD), a Complex Programmable Logic Device (CPLD), a Field-Programmable Gate Array (FPGA), or other electronic elements.

In some embodiments, the terminal or server can implement the method for creating a team in a virtual scene according to the embodiments of this disclosure by running a computer program. For example, the computer program may be a native program or a software module in an operating system, or may be a native application (APP), namely, a program that needs to be installed in an operating system to run, such as a game APP or an instant messaging APP, or may be a mini program, namely, a program that only needs to be downloaded into a browser environment to run, or may be a mini program that can be embedded in any APP. In a word, the above-mentioned computer program may be any form of application program, module or plug-in.

Based on the above descriptions of the system for creating a team in a virtual scene and the electronic device according to the embodiments of this disclosure, the method for creating a team in a virtual scene according to the embodiments of this disclosure will be described below. In some embodiments, the method for creating a team in a virtual scene according to the embodiments of this disclosure may be implemented independently by a server or a terminal, or implemented jointly by a server and a terminal. The method for creating a team in a virtual scene according to the embodiments of this disclosure will be described below by taking implementation by a terminal as an example.

Figure 3:
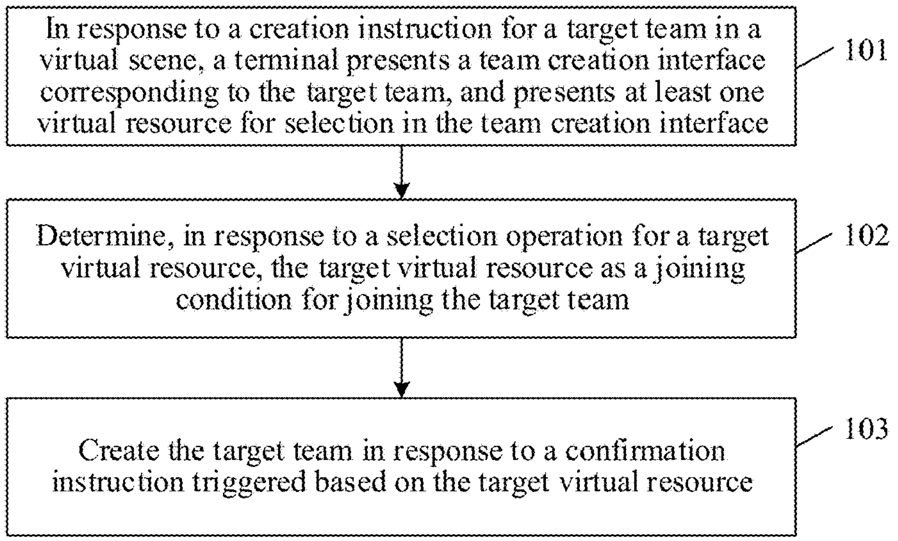
FIG. 3 is a schematic flowchart of a method for creating a team in a virtual scene according to embodiments of this disclosure.

With reference to FIG. 3, FIG. 3 is a schematic flowchart of a method for creating a team in a virtual scene according to embodiments of this disclosure. The method for creating a team in a virtual scene according to embodiments of this disclosure includes the following steps.

Step 101: In response to a creation instruction for a target team in a virtual scene, a terminal presents a team creation interface corresponding to the target team, and presents at least one virtual resource for selection in the team creation interface.

Here, a client that supports team creation in a virtual scene is installed on the terminal. The client may be a client that supports a virtual scene (such as a game client), or a client integrated with a function of creating a team in a virtual scene (such as an instant messaging client, a live streaming client, and a team-up client). When a user opens the client on the terminal and the terminal runs the client, the user can create a target team in a virtual scene on the client. The target team is used for members in the target team to interact in the virtual scene, for example, for the members of the target team to play games. When receiving a creation instruction for a target team in a virtual scene, the terminal presents a team creation interface corresponding to the target team. In practical applications, the team creation interface may display information of the virtual scene (such as a name, an identifier, a team-up interaction mode, or the like of the virtual scene), a name setting function item of the target team, or the like.

In the embodiments of this disclosure, a joining condition for joining the created target team can also be set, namely, transmitting a target virtual resource to the creator of the target team. Therefore, the terminal further needs to present at least one virtual resource for selection in the team creation interface. In some embodiments, the number of virtual resources can be multiple (that is, at least two). When there are multiple virtual resources, the multiple virtual resources can correspond to different resource types. For example, two types of virtual resources are displayed in the team creation interface, namely, virtual gold coins used for purchasing virtual props or decorations, and virtual gifts (such as virtual flowers and virtual boats). After the user selects a target virtual resource from the displayed virtual resources for selection, the target virtual resource is used as a joining condition for joining the target team.

Next, triggering of the creation instruction for the target team will be described. In some embodiments, the terminal may receive a creation instruction for a target team in a virtual scene as follows:

presenting a first team creation entry of at least one candidate virtual scene, the at least one candidate virtual scene including the virtual scene; and receiving a creation instruction for a target team in the virtual scene in response to a trigger operation for the first team creation entry of the virtual scene.

Here, the number of candidate virtual scenes may be at least two, the terminal presents a first team creation entry of at least one candidate virtual scene, and the at least one candidate virtual scene includes the above-mentioned virtual scene. In practical applications, the candidate virtual scenes may have one-to-one correspondence with first team creation entries. That is, when the number of displayed candidate virtual scenes for selection is at least two, for the candidate virtual scenes, first team creation entries corresponding to the candidate virtual scenes are respectively displayed. The user can trigger (for example, click on) the first team creation entry corresponding to the corresponding candidate virtual scene to trigger a creation instruction for a team in the corresponding candidate virtual scene. When receiving a trigger operation for the first team creation entry of the virtual scene, the terminal receives a creation instruction for a target team in the virtual scene in response to the trigger operation.

Figure 4:
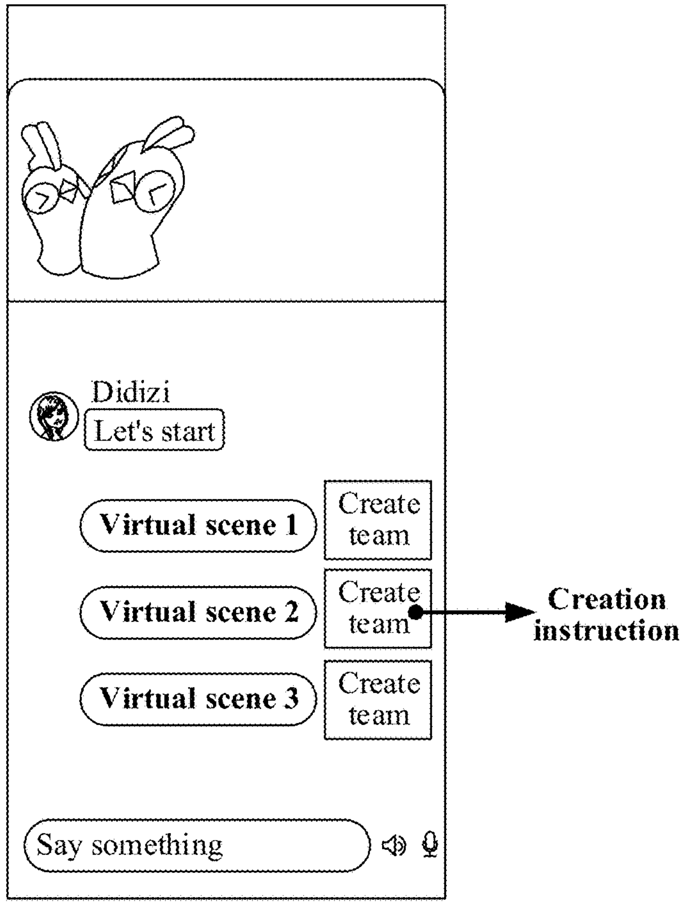
FIG. 4 is a schematic diagram of a triggering process of a creation instruction for a target team in a virtual scene according to embodiments of this disclosure.

As an example, with reference to FIG. 4, FIG. 4 is a schematic diagram of a triggering process of a creation instruction for a target team in a virtual scene according to embodiments of this disclosure. Here, the terminal presents first team creation entries "Create team" of multiple candidate virtual scenes (including Virtual scene 1, Virtual scene 2, and Virtual scene 3) in the view interface, and receives a creation instruction for a target team in "Virtual scene 2" in response to a trigger operation for the first team creation entry "Create team" of "Virtual scene 2".

In some embodiments, the terminal may receive a creation instruction for a target team in a virtual scene as follows: presenting a second team creation entry of a virtual scene; presenting at least one candidate object for selection in response to a trigger operation for the second team creation entry; and receiving, in response to a selection confirmation operation for a target candidate object, a creation instruction for a target team corresponding to the target candidate object in the virtual scene.

Here, the number of candidate objects may be at least two, and when creating the target team in the virtual scene, a team member of the target team may also be pre-selected. For example, the terminal presents a second team creation entry of the virtual scene, where the second team creation entry can be used for the user to select a team member of the target team; and in response to a trigger operation for the second team creation entry, the terminal presents at least one candidate object for selection, where the candidate object may be a social friend, a group friend, a historical team-up object, etc. of the user (i.e., the creator of the target team), and the user may perform selection as required. When receiving a selection operation for a target candidate object and a selection confirmation operation for the target candidate object, the terminal receives, in response to the selection confirmation operation, a creation instruction for a target team corresponding to the target candidate object in the virtual scene, the target candidate object becoming a team member of the created target team. In practical applications, there may be one or more (that is, at least two) target candidate objects selected.

Figure 5:
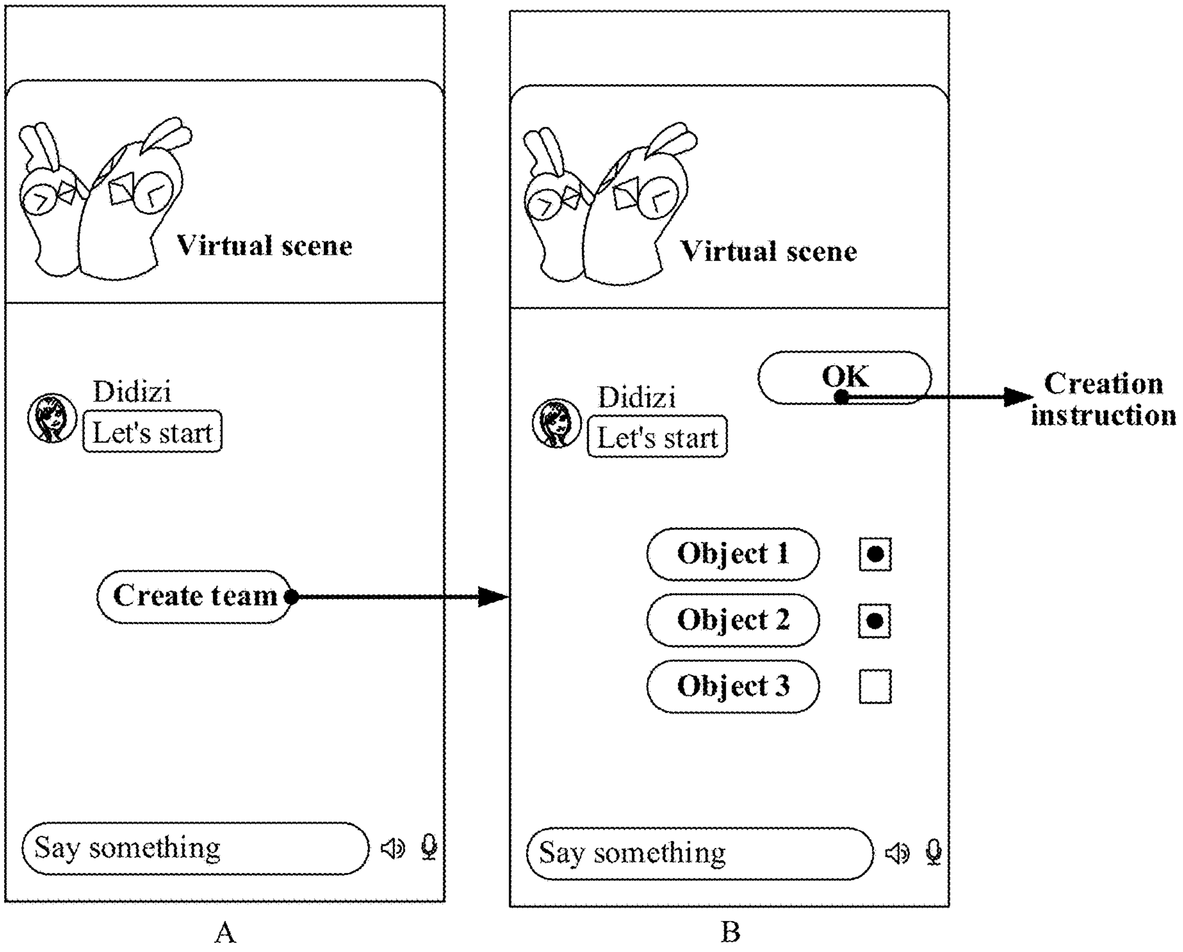
FIG. 5 is a schematic diagram of a triggering process of a creation instruction for a target team in a virtual scene according to embodiments of this disclosure.

As an example, with reference to FIG. 5, FIG. 5 is a schematic diagram of a triggering process of a creation instruction for a target team in a virtual scene according to embodiments of this disclosure. Here, the terminal presents a second team creation entry "Create team" of a virtual scene in the view interface, as shown in figure A of FIG. 5. In response to a trigger operation for the second team creation entry "Create team", multiple candidate objects for selection are presented, including Object 1, Object 2, and Object 3, as shown in figure B of FIG. 5. In response to a selection confirmation operation for a target candidate object, i.e., a selection confirmation operation for "Object 1 and Object 2", a creation instruction for a target team corresponding to the target candidate object in the virtual scene is received.

In some embodiments, the terminal may receive a creation instruction for a target team in a virtual scene as follows: presenting a third team creation entry in a data card interface of a target object; receiving a creation instruction for a target team in the virtual scene in response to a trigger operation for the third team creation entry; and transmitting team-up invitation information to the target object, the team-up invitation information being used for inviting the target object to join the target team.

Here, the terminal can present a third team creation entry in a data card interface of a target object. In practical applications, when a user needs to view data of a certain object, the user can view it through a data card interface of the object. The data card interface can display data information of the corresponding object, such as name, identifier, gender, and other basic information of the object. In the embodiments of this disclosure, a third team creation entry can also be presented in a data card interface of an object, so that when the user views the data card of a certain object, a team creation instruction can be triggered through the third team creation entry, so that the user can conveniently team up with the object.

In practical applications, when the user views a data card of a target object, the terminal presents a data card interface of the target object, and presents a third team creation entry in the data card interface; when receiving a trigger operation for the third team creation entry, the terminal receives a creation instruction for a target team in the virtual scene in response to the trigger operation; and the terminal transmits team-up invitation information to the target object, so as to invite the target object to join the target team through the team-up invitation information. During actual implementation, the target object can join the created target team, and in addition, other objects can also join the target team by meeting the joining condition.

Figure 6:
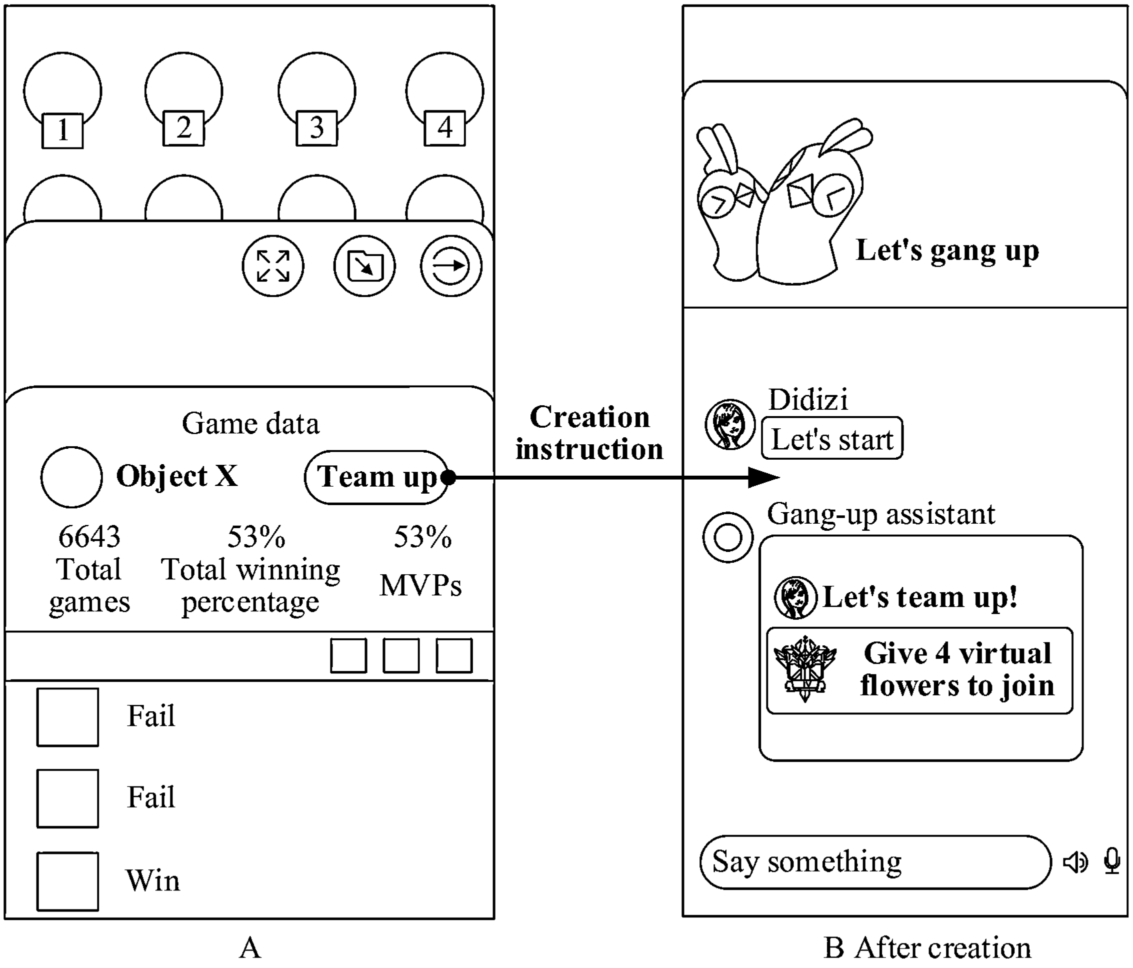
FIG. 6 is a schematic diagram of a triggering process of a creation instruction for a target team in a virtual scene according to embodiments of this disclosure.

As an example, with reference to FIG. 6, FIG. 6 is a schematic diagram of a triggering process of a creation instruction for a target team in a virtual scene according to embodiments of this disclosure. Here, the terminal presents a data card interface of a target object "Object X", and presents a third team creation entry "Team up" in the data card interface, as shown in figure A of FIG. 6. A creation instruction for a target team in the virtual scene is received in response to a trigger operation for the third team creation entry "Team up". After creation of the target team is completed, a team-up invitation information "Let's team up" is transmitted to the target object, as shown in figure B in FIG. 6. The terminal interface displaying the team-up invitation information corresponds to the target object "Object X".

In some embodiments, the terminal may receive a creation instruction for a target team in a virtual scene as follows: creating a group corresponding to a virtual scene, and presenting a fourth team creation entry in a group interface of the group; and receiving a creation instruction for a target team in the virtual scene in response to a trigger operation for the fourth team creation entry.

Here, a group corresponding to a virtual scene can also be pre-created, and the group can be used for users (including group members who join the group and users who enter the group as guests) to conduct conversations and communication, watch live streaming together, or the like. The group may be a conversation group (such as a chat group in an instant messaging client, and a chat group in a game client), a live streaming studio group (such as a live streaming studio in a live streaming client), or the like. After the group corresponding to the virtual scene is created, a fourth team creation entry is presented in the group interface of the group, for group members who join the group and users who enter the group as guests to create a team, so as to interact in the virtual scene based on the team. When receiving a trigger operation for the fourth team creation entry, a creation instruction for a target team in the virtual scene is received in response to the trigger operation.

In some embodiments, the terminal may create a group corresponding to a virtual scene as follows: creating a group corresponding to a virtual scene in a client interface other than an application of the virtual scene; the group including at least one object other than a current object, and the object and the current object having a social association relationship in the application.

In practical applications, the group can be created in an application other than the application of the virtual scene, such as a chat group created in an instant messaging client, a live streaming studio group created in a live streaming client, or the like. The group includes at least one object other than the current object (that is, the creator), and the at least one object and the current object may have a social association relationship in the application. For example, the at least one object and the current object belong to the same virtual organization. For example, when the client of the virtual scene is a game client, the virtual organization may be a game guild.

In some embodiments, the terminal may transmit and present team joining invitation information corresponding to the target team in the conversation interface of the group. The team joining invitation information is used for inviting an object in the group to join the target team.

Here, after completing creation of the target team in the virtual scene based on the fourth team creation entry in the group, the terminal can transmit and present corresponding team joining invitation information in the conversation interface of the group, to invite an object in the group to join the target team based on the team joining invitation information.

In some embodiments, after creation of the target team is completed, a conversation interface may be automatically jumped to, and team joining invitation information is transmitted to and presented in the conversation interface. A conversation function item may also be presented after the target team is created; when a trigger operation for the conversation function item is received, a conversation interface is presented, and team joining invitation information is transmitted to and presented in the conversation interface.

Figure 7:
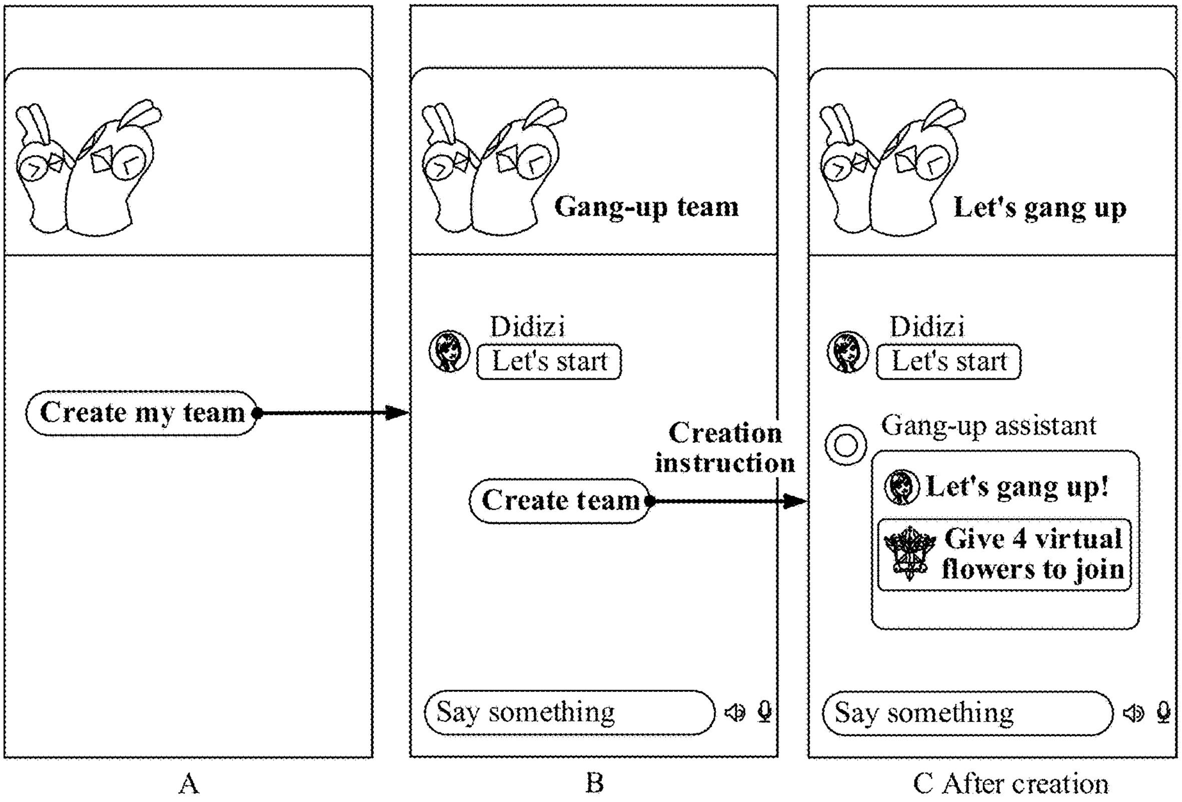
FIG. 7 is a schematic diagram of a triggering process of a creation instruction for a target team in a virtual scene according to embodiments of this disclosure.

As an example, with reference to FIG. 7, FIG. 7 is a schematic diagram of a triggering process of a creation instruction for a target team in a virtual scene according to embodiments of this disclosure. Here, the terminal receives a trigger operation for a group creation function item "Create my team", creates a group "Gang-up team" corresponding to the virtual scene, and presents a fourth team creation entry "Create team" in a group interface of the group, as shown in figures A and B in FIG. 7. A creation instruction for a target team in the virtual scene is received in response to a trigger operation for the fourth team creation entry "Create team".

After creation of the target team is completed, the terminal may transmit and present team joining invitation information "Let's gang up!" corresponding to the target team in a conversation interface corresponding to the group, as shown in figure C in FIG. 7, so as to invite an object in the group to join the target team based on the team joining invitation information.

In some embodiments, the terminal may enable a joining condition setting function as follows: presenting a condition setting function switch; and enabling a joining condition setting function for the target team in response to a trigger operation for the condition setting function switch.

Correspondingly, the terminal may present at least one virtual resource for selection as follows: presenting at least one virtual resource for selection in a team creation interface when the joining condition setting function for the target team is enabled.

In some embodiments, the terminal may present a condition setting function switch as follows: presenting a condition setting function switch corresponding to the target team in the team creation interface; or presenting a condition setting function switch in a setting interface of the virtual scene.

Here, the terminal may provide a condition setting function switch, and the condition setting function switch is used for controlling enabling and disabling of the joining condition setting function. When the joining condition setting function for the target team is enabled, a joining condition can be set when creating the target team, and in this case, the terminal can present at least one virtual resource for selection in the team creation interface; When the joining condition setting function for the target team is disabled, no joining condition can be set when creating the target team, and in this case, the created target team can be joined without a joining condition.

In practical applications, the terminal may present a condition setting function switch. In some embodiments, the terminal may present a condition setting function switch corresponding to a target team in a team creation interface, so that it is convenient to set whether a joining condition needs to be set for a currently created team during team creation each time; the terminal may also present a condition setting function switch in a setting interface of a virtual scene, so as to achieve unified management on whether a joining condition needs to be set during all team creation, thereby improving the efficiency of team creation. When a trigger operation for the condition setting function switch is received, the joining condition setting function for the target team is enabled in response to the trigger operation. In this case, the terminal may present at least one virtual resource for selection in the team creation interface, for the user to set a joining condition.

Figure 8:
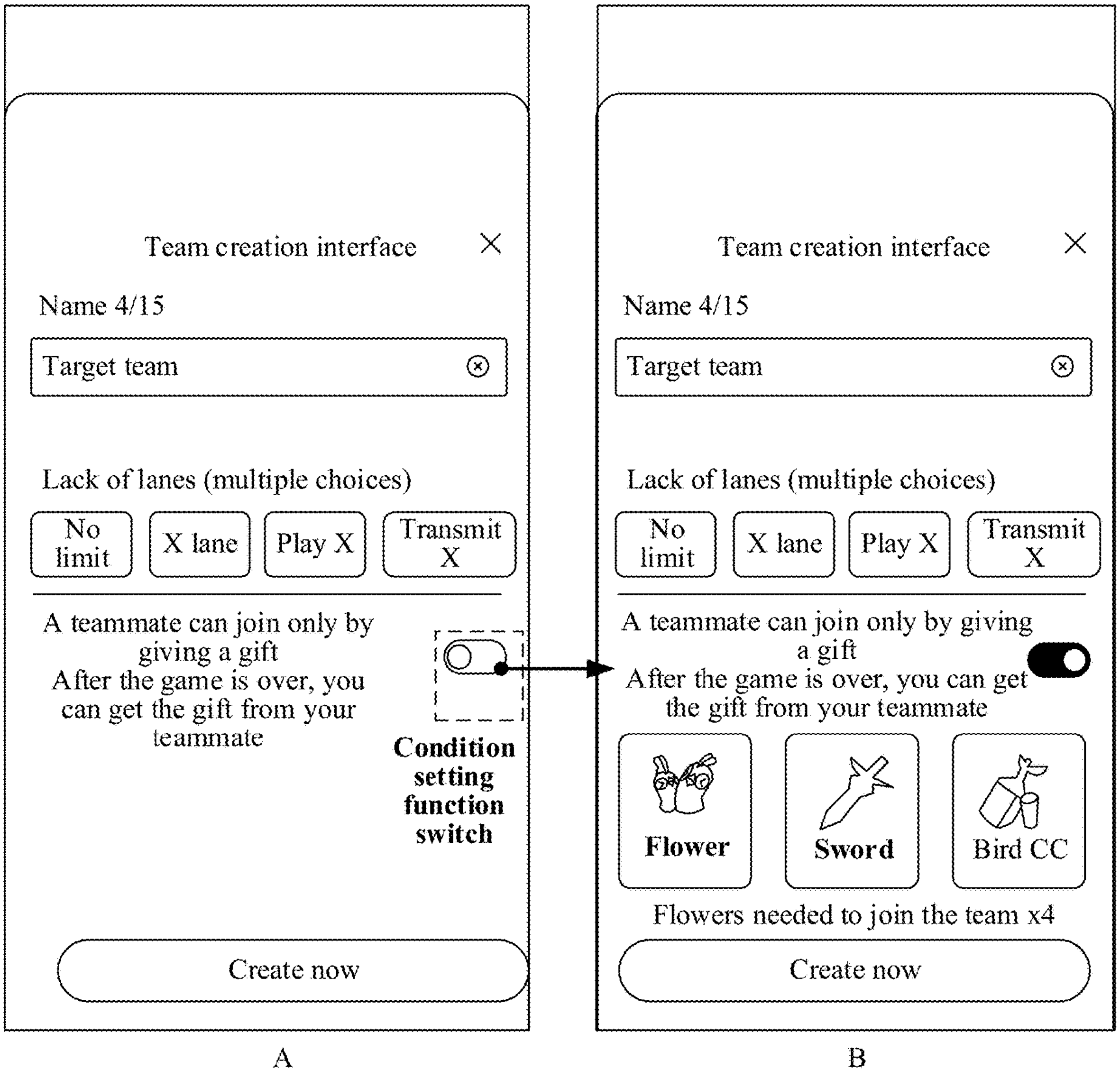
FIG. 8 is a schematic diagram of an enabling process of a joining condition setting function according to embodiments of this disclosure.

As an example, with reference to FIG. 8, FIG. 8 is a schematic diagram of an enabling process of a joining condition setting function according to embodiments of this disclosure. Here, the terminal presents a condition setting function switch in a team creation interface corresponding to a target team, as shown in figure A in FIG. 8. In response to a trigger operation for the condition setting function switch, a joining condition setting function for the target team is enabled, and at this time, at least one virtual resource for selection is presented in the team creation interface, such as "Sword" and "Flower", as shown in figure B in FIG. 8.

Step 102: Determine, in response to a selection operation for a target virtual resource, the target virtual resource as a joining condition for joining the target team.

The joining condition is used for indicating that upon receiving of a transmitted target virtual resource, it is determined that a corresponding transmitting object is a member of the target team.

Here, after the terminal presents, in response to a creation instruction for a target team in a virtual scene, a team creation interface corresponding to the target team, and presents one or more virtual resource for selection in the team creation interface, the creator of the target team may set a joining condition by selecting a required virtual resource. When a selection operation for a target virtual resource in the at least one virtual resource is received, the target virtual resource is determined as a joining condition for joining the target team in response to the selection operation. The joining condition is used for indicating that upon receiving of a transmitted target virtual resource (by the creator), it is determined that a corresponding transmitting object is a member of the target team, that is, the transmitting object joins the target team.

In some embodiments, the terminal may determine the target virtual resource as a joining condition for joining the target team as follows: presenting a quantity setting function item corresponding to the target virtual resource in response to the selection operation for the target virtual resource in the at least one virtual resource; receiving a target quantity set for the target virtual resource based on the quantity setting function item; and determining the target quantity of target virtual resources as a joining condition for joining the target team.

Here, when setting the joining condition, the number of selected target virtual resources may also be set. In some embodiments, a quantity setting function item corresponding to the target virtual resource is presented in response to the selection operation for the target virtual resource in the at least one virtual resource, and the user may set the quantity of target virtual resources based on the quantity setting function item, for example, a number representing the quantity may be input. When a target quantity set for the target virtual resource is received based on the quantity setting function item, the target quantity of target virtual resources is determined as a joining condition for joining the target team.

Figure 9:
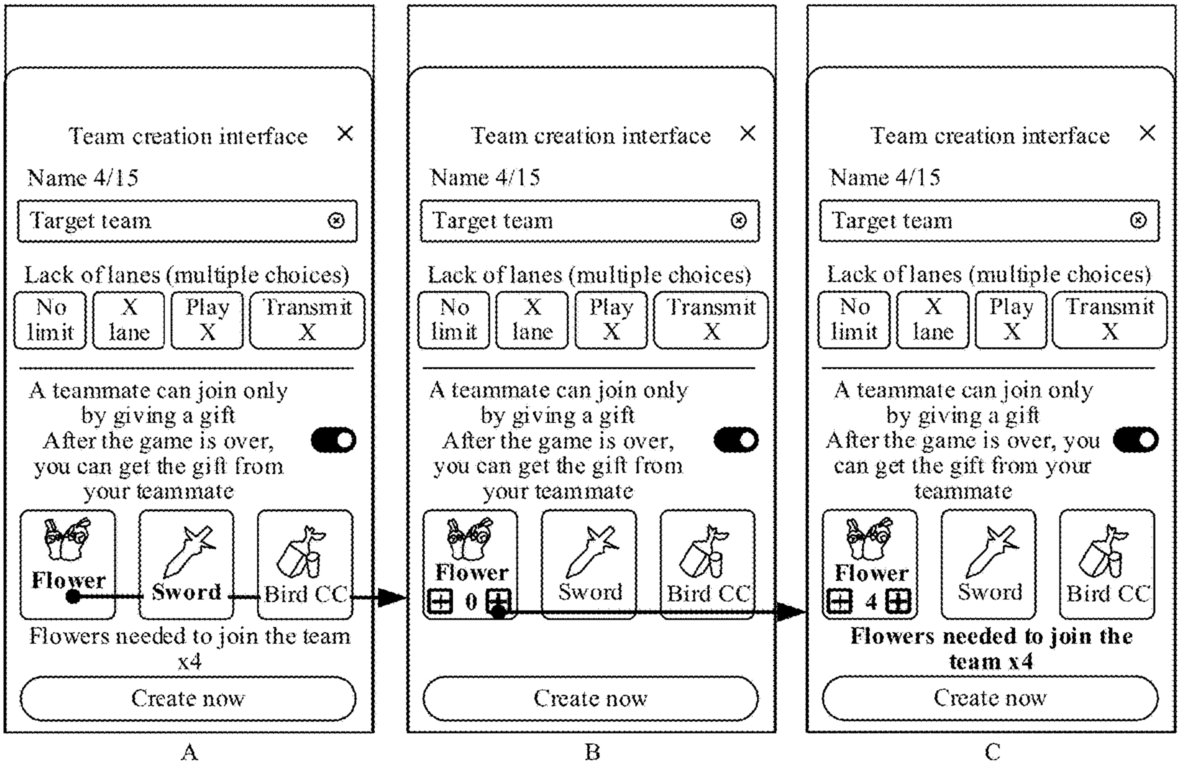
FIG. 9 is a schematic diagram of a joining condition setting process according to embodiments of this disclosure.

As an example, with reference to FIG. 9, FIG. 9 is a schematic diagram of a joining condition setting process according to embodiments of this disclosure. Here, the terminal presents multiple virtual resources, such as "Sword" and "Flower", as shown in figure A in FIG. 9. In response to a selection operation on a target virtual resource "Flower", a quantity setting function item corresponding to "Flower" is presented. The number setting function item includes a function item "+" used for increasing the quantity and a function item "–" used for reducing the quantity, as shown in figure B in FIG. 9. A target quantity "4" set for "Flower" is received based on the quantity setting function item, and "4 flowers" is determined as a joining condition for joining the target team, as shown in figure C in FIG. 9.

Step 103: Create the target team in response to a confirmation instruction triggered based on the target virtual resource.

Here, after the terminal determines the joining condition for joining the target team, when it receives a confirmation instruction triggered based on the target virtual resource, the terminal creates the target team in response to the confirmation instruction for a member in the target team to perform interaction in the virtual scene.

Figure 10:
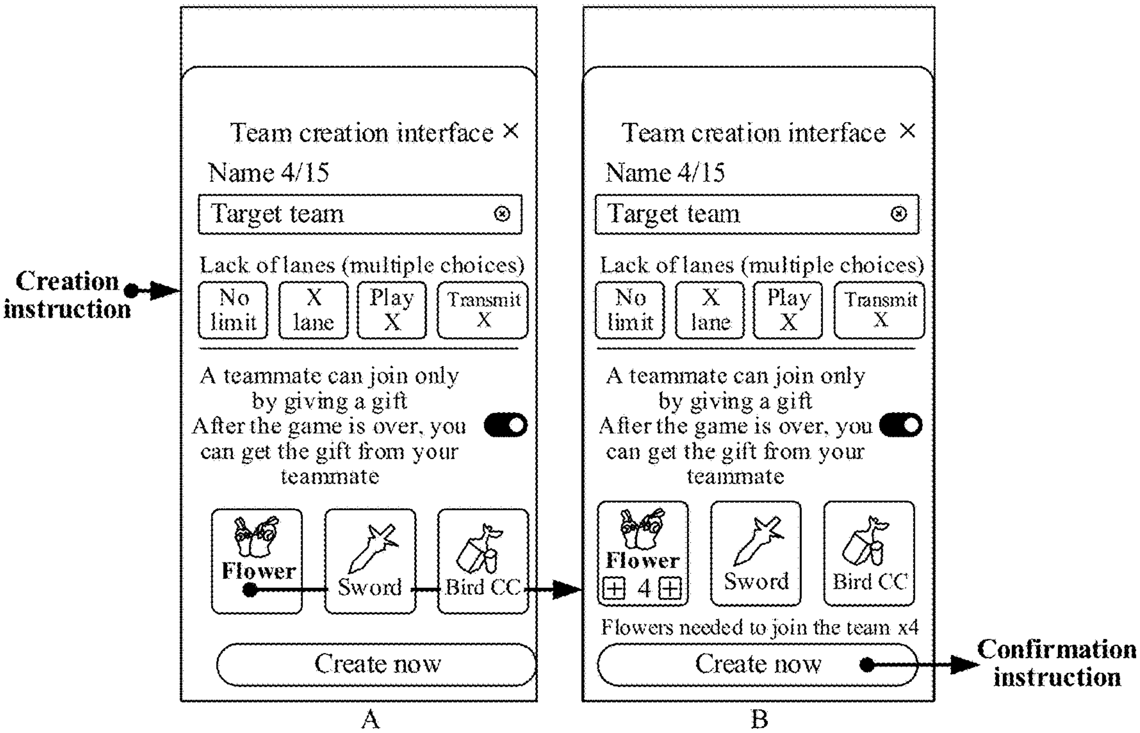
FIG. 10 is a schematic diagram of a target team creation process according to embodiments of this disclosure.

As an example, with reference to FIG. 10, FIG. 10 is a schematic diagram of a target team creation process according to embodiments of this disclosure. Here, in response to a creation instruction for a target team in a virtual scene, the terminal presents a team creation interface corresponding to the target team and presents at least two virtual resources for selection in the team creation interface, such as "Sword" and "Flower", and further presents a creation confirmation function item "Create now" in the team creation interface, as shown in figure A in FIG. 10. In response to a selection operation for a target virtual resource "Flower", the target virtual resource "Flower" is determined as a joining condition for joining the target team, as shown in figure B in FIG. 10. In response to a trigger operation for the creation confirmation function item "Create now", a confirmation instruction triggered based on the target virtual resource is received, and the target team is created at this time.

In some embodiments, the terminal may control members of the target team to enter the virtual scene as follows: presenting an enabling function entry of the virtual scene; presenting a scene entry interface of the virtual scene in response to a trigger operation for the enabling function entry; and controlling members joining the target team to enter the virtual scene when a virtual scene entry instruction triggered based on the scene entry interface is received.

Here, after completing creation of the target team in the virtual scene, the terminal presents an enabling function entry corresponding to the virtual scene, and when receiving a trigger operation for the enabling function entry, presents a scene entry interface of the virtual scene. The scene entry interface may include a function item for controlling members of the target team to enter the virtual scene. Members joining the target team are controlled to enter the virtual scene when a virtual scene entry instruction triggered based on the scene entry interface is received, so that the members of the target team perform an interaction operation in the virtual scene.

In some embodiments, the terminal performs interface return to an interface corresponding to the enabling function entry before controlling the members joining the target team to enter the virtual scene and when an interface return operation for the scene entry interface is received, presents an entry function item corresponding to the virtual scene in the interface corresponding to the enabling function entry, and presents the scene entry interface again when a trigger operation for the entry function item is received.

Here, the terminal performs interface return to an interface corresponding to the enabling function entry before controlling the members joining the target team to enter the virtual scene and when an interface return operation for the scene entry interface is received, presents an entry function item corresponding to the virtual scene in the interface corresponding to the enabling function entry, and presents the scene entry interface again when a trigger operation for the entry function item is received. In this way, free switching between the interface where the target team is located and the scene entry interface is implemented. After enabling the virtual scene and waiting for other members to join, the user can return to the interface corresponding to the enabling function entry to check the target team, for example, checking whether there is a new member joins the target team.

Figure 11:
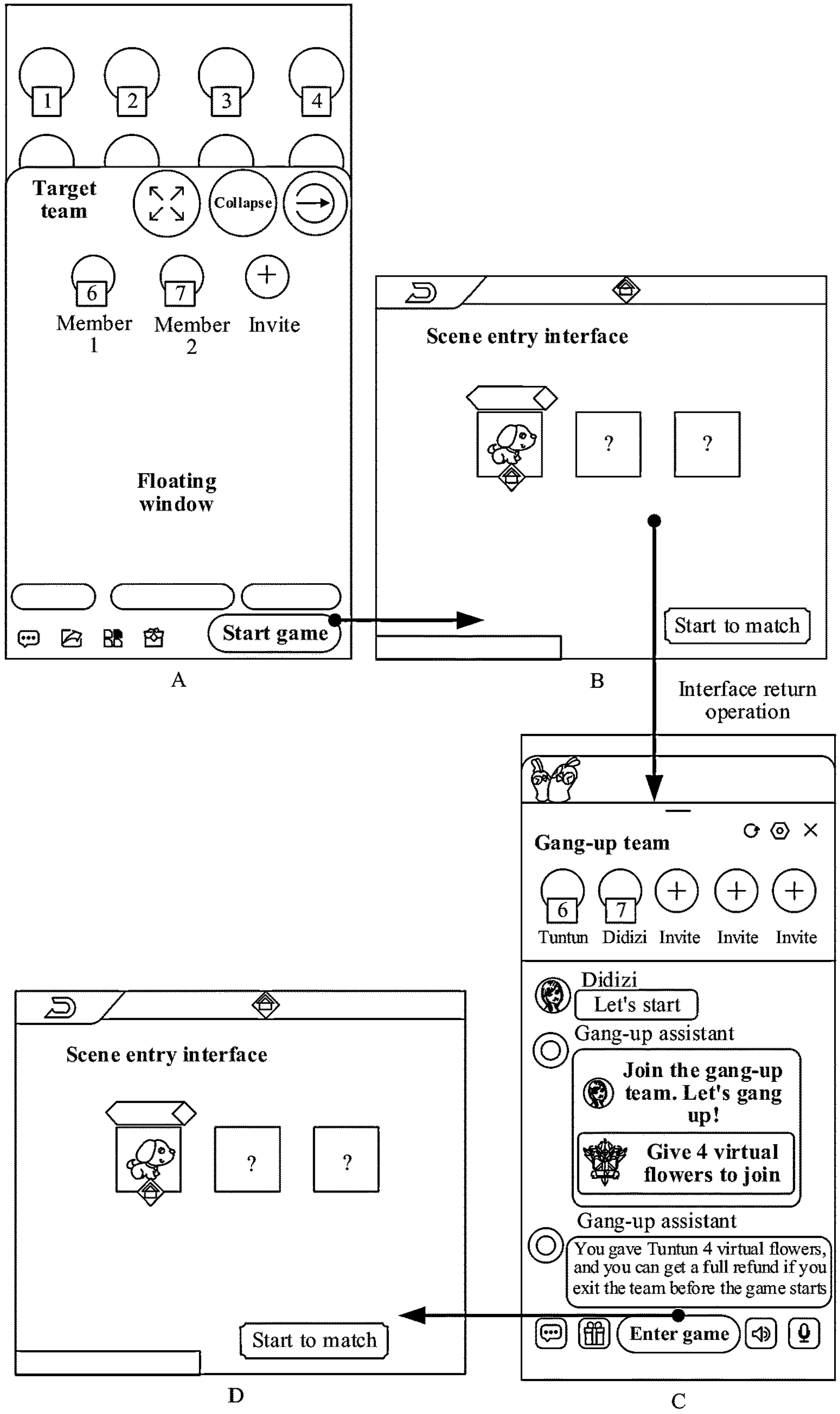
FIG. 11 is a schematic diagram of an entry process of a scene entry interface of a virtual scene according to embodiments of this disclosure.

As an example, with reference to FIG. 11, FIG. 11 is a schematic diagram of an entry process of a scene entry interface of a virtual scene according to embodiments of this disclosure. Here, after completing creation of the target team in the virtual scene, the terminal presents an enabling function entry "Start game" corresponding to the virtual scene, as shown in figure A in FIG. 11. When a trigger operation for the enabling function entry "Start game" is received, a scene entry interface corresponding to the virtual scene is presented, as shown in figure B in FIG. 11. Interface return to an interface corresponding to the enabling function entry is performed when an interface return operation for the scene entry interface is received, and an entry function item "Enter game" corresponding to the virtual scene is presented in the interface corresponding to the enabling function entry, as shown in figure C in FIG. 11. The scene entry interface is presented again when a trigger operation for the entry function item "Enter game" is received, as shown in figure D in FIG. 11.

In some embodiments, the terminal may present an enabling function entry corresponding to the virtual scene as follows: presenting the enabling function entry of the virtual scene through a floating window.

Correspondingly, the terminal may further present a collapse function item of the floating window. The floating window is collapsed to a floating window expansion function item when a trigger operation for the collapse function item is received. The floating window expansion function item is used for expanding the floating window when a floating window expansion instruction triggered based on the floating window expansion function item is received, to present the enabling function entry again.

Here, the terminal may present the enabling function entry of the virtual scene through a floating window. In practical applications, the floating window may present information of the virtual scene (such as an identifier and an interaction mode of the virtual scene), and information of the target team, such as information of members of the team and a name of the team. In the embodiments of this disclosure, the floating window may be collapsed so that the view interface displays other information for the user to use. In some embodiments, the terminal presents a collapse function item corresponding to the floating window, and when a trigger operation for the collapse function item is received, the floating window is collapsed to a floating window expansion function item. When the user needs to view the content displayed in the floating window again, a floating window expansion instruction can be triggered through the floating window expansion function item. When the terminal receives the floating window expansion instruction triggered based on the floating window expansion function item, the floating window is expanded in response to the floating window expansion instruction to present the enabling function entry again.

Figure 12:
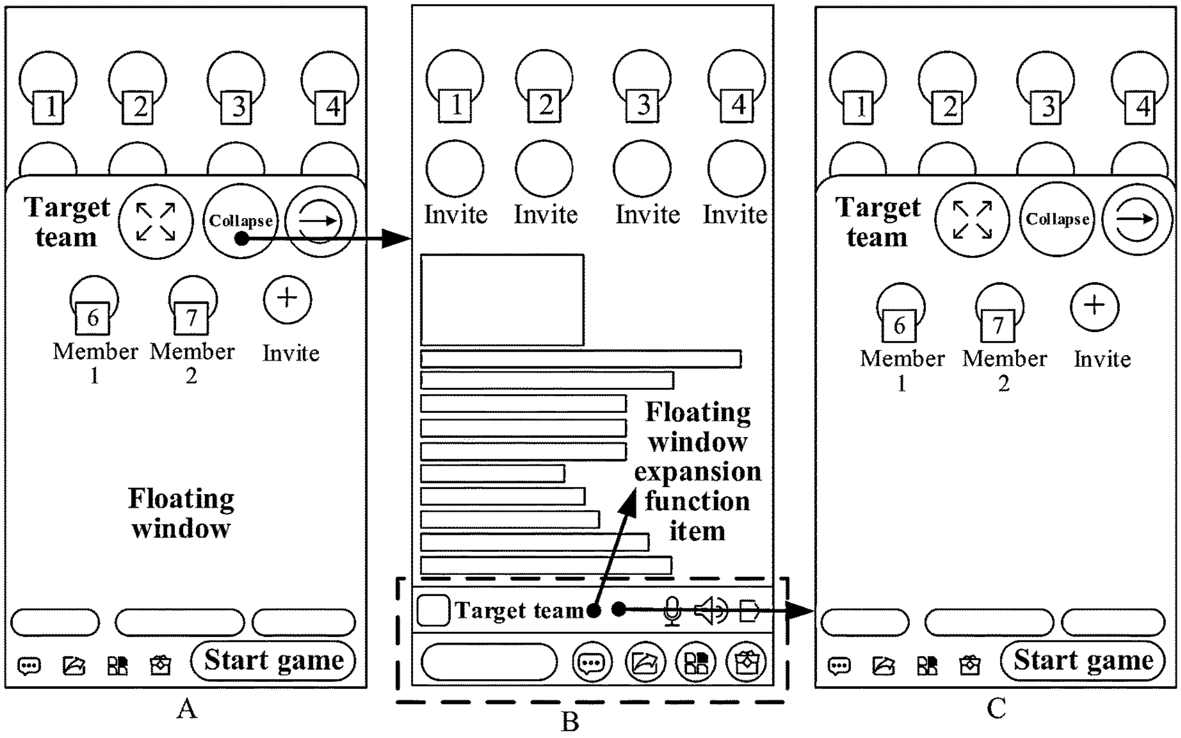
FIG. 12 is a schematic diagram of a floating window collapse and expansion process according to embodiments of this disclosure.

As an example, with reference to FIG. 12, FIG. 12 is a schematic diagram of a floating window collapse and expansion process according to embodiments of this disclosure. Here, the terminal presents the enabling function entry "Start game" of the virtual scene through a floating window, and presents a collapse function item "Collapse" of the floating window, as shown in figure A in FIG. 12. The floating window is collapsed to a floating window expansion function item in response to a trigger operation for the collapse function item "Collapse", as shown in figure B in FIG. 12. In response to a floating window expansion instruction triggered based on the floating window expansion function item (for example, the floating window expansion instruction can be triggered by pressing and holding the floating window expansion function item, clicking on the floating window expansion function item, dragging the floating window expansion function item, etc.), the floating window is expanded to present the enabling function entry again, as shown in figure C in FIG. 12.

In some embodiments, the terminal may remove a member of the target team as follows: presenting a removal function item corresponding to a member in the target team; presenting, in response to a trigger operation for the removal function item, prompt information used for prompting whether to remove the member from the target team; and removing the member from the target team in response to a removal confirmation instruction triggered based on the prompt information, and returning the target virtual resource to the member.

Here, the terminal may also present a removal function item corresponding to a member in the target team, and the removal function item can have a one-to-one correspondence with the member, or a one-to-many relationship with members (that is, one removal function item corresponds to multiple members). A user (such as the creator of the target team) can remove a member who has joined the target team through this removal function item. When a trigger operation for the removal function item is received, prompt information used for prompting whether to remove the member from the target team is presented, and the member is removed from the target team in response to a removal confirmation instruction triggered based on the prompt information. Moreover, since the member has transmitted a target virtual resource to the creator when joining the target team, there is a need to return the target virtual resource to the removed member at this time.

When the removal function item has a one-to-one correspondence with the member, the terminal presents removal function items corresponding to members in the target team. In response to a trigger operation for the removal function item corresponding to a target member, prompt information used for prompting whether to remove the target member from the target team is presented. The target member is removed from the target team in response to a removal confirmation instruction triggered based on the prompt information, and the target virtual resource is returned to the target member.

Figure 13:
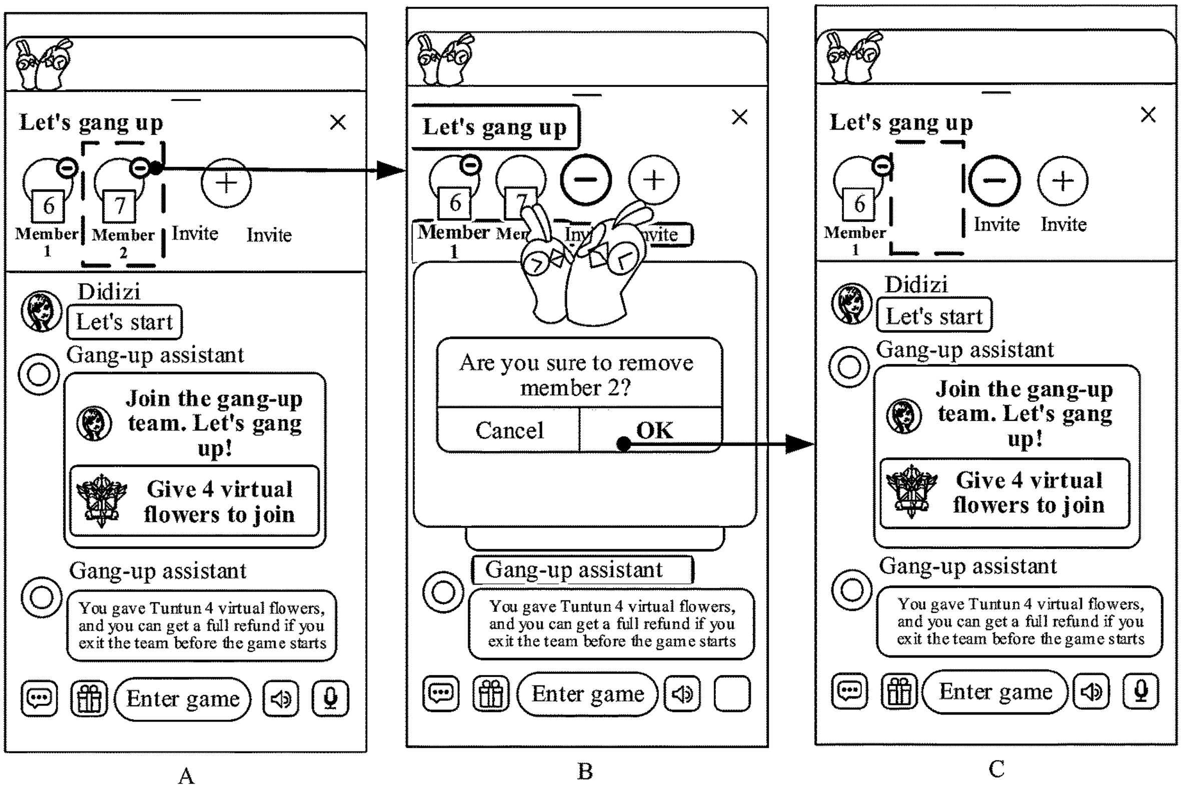
FIG. 13 is a schematic diagram of a target member removal process according to embodiments of this disclosure.

As an example, with reference to FIG. 13, FIG. 13 is a schematic diagram of a target member removal process according to embodiments of this disclosure. Here, the terminal presents removal function items "-" corresponding to members of the target team, including Member 1 and Member 2, as shown in figure A in FIG. 13. In response to a trigger operation for the removal function item "-" corresponding to "Member 2", prompt information "Are you sure to remove member 2?" used for prompting whether to remove the target member from the target team is presented, as shown in figure B in FIG. 13. Member 2 is removed from the target team in response to a removal confirmation instruction (for example, clicking on an "OK" button) triggered based on the prompt information, as shown in figure C in FIG. 13.

When the removal function item has a one-to-many relationship with members (that is, one removal function item corresponds to multiple members), the terminal presents the removal function item corresponding to members in the target team. Members for selection are presented in response to a trigger operation for the removal function item. In response to a selection confirmation operation for a target member, prompt information used for prompting whether to remove the target member from the target team is presented. The target member is removed from the target team in response to a removal confirmation instruction triggered based on the prompt information, and the target virtual resource is returned to the target member.

Figure 14:
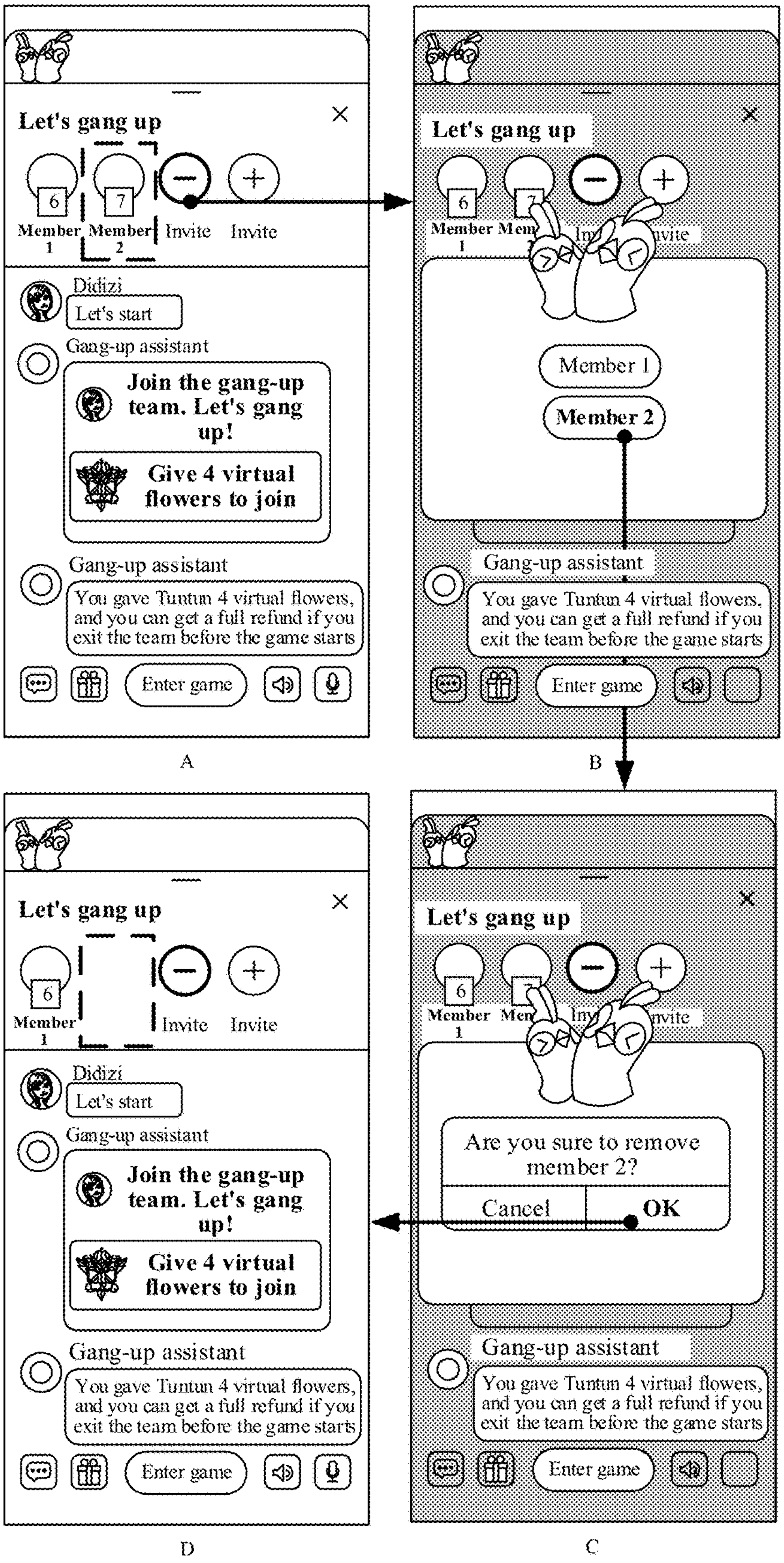
FIG. 14 is a schematic diagram of a target member removal process according to embodiments of this disclosure.

As an example, with reference to FIG. 14, FIG. 14 is a schematic diagram of a target member removal process according to embodiments of this disclosure. Here, the terminal presents a removal function item "-" corresponding to members of the target team, as shown in figure A in FIG. 14. In response to a trigger operation for the removal function item "-", members for selection are presented, including Member 1 and Member 2, as shown in figure B in FIG. 14. In response to a selection confirmation operation for a target member "Member 2", prompt information "Are you sure to remove member 2?" used for prompting whether to remove the target member from the target team is presented, as shown in figure C in FIG. 14. Member 2 is removed from the target team in response to a removal confirmation instruction (for example, clicking on an "OK" button) triggered based on the prompt information, as shown in figure D in FIG. 14.

In some embodiments, after interaction among members of the target team in the virtual scene ends, the terminal can present an interaction result corresponding to the virtual scene, and output a receiving and display process corresponding to the target virtual resource.

Figure 15:
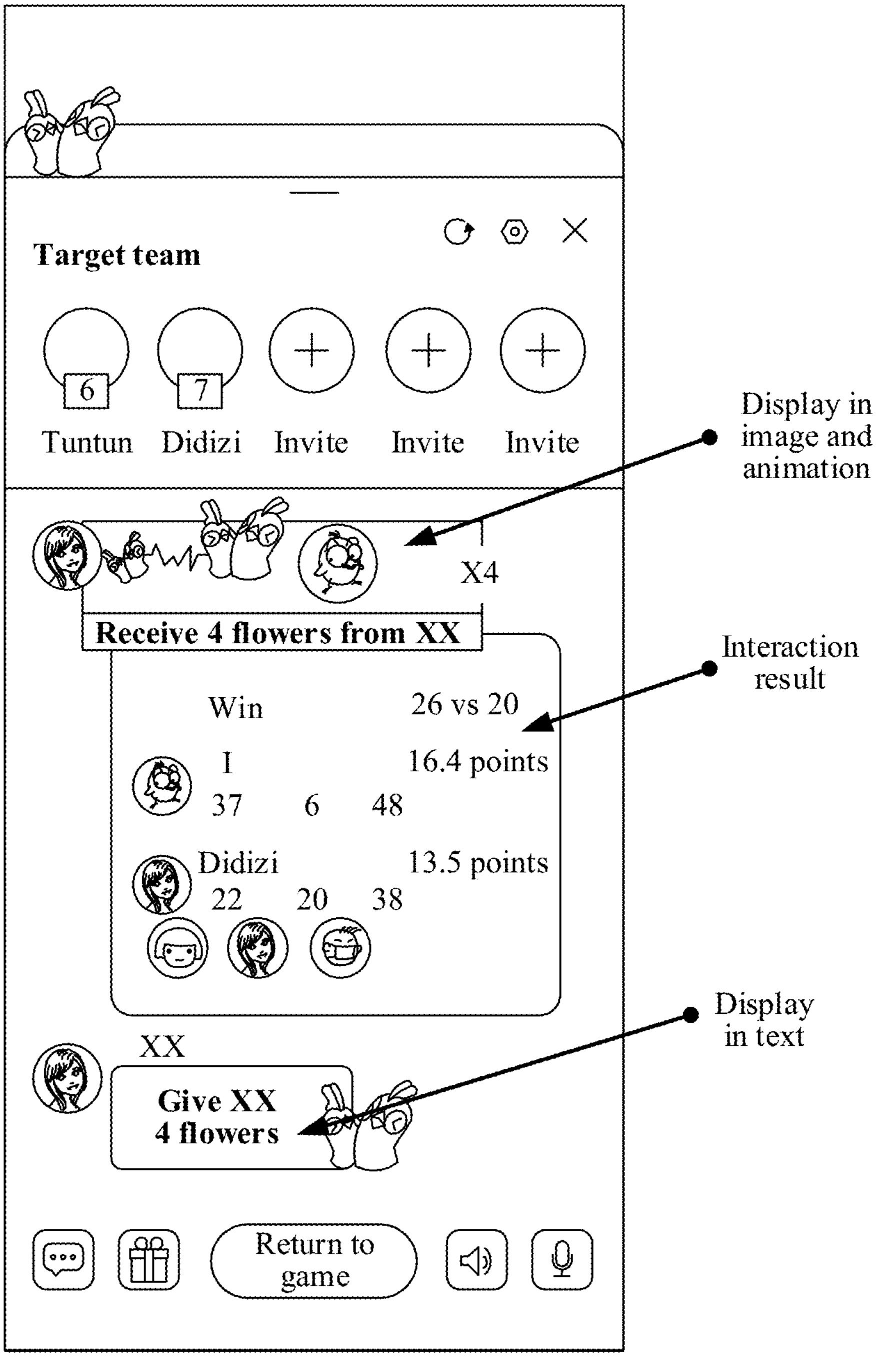
FIG. 15 is a schematic diagram of a target virtual resource receiving and display process according to embodiments of this disclosure.

Here, with reference to FIG. 15, FIG. 15 is a schematic diagram of a target virtual resource receiving and display process according to embodiments of this disclosure. After interaction among members of the target team in the virtual scene ends, the terminal can present an interaction result corresponding to the virtual scene, and output a receiving and display process corresponding to the target virtual resource. The receiving and display process is used for indicating acknowledgment (ACK) information for the target virtual resource. The output process may be performed through various media display modes such as voice, video, animation, and text. For example, the received target virtual resource may be output through voice broadcast, such as "4 flowers from XX have been received". It is also possible to display an image of the target virtual resource or receive an animation. It is also possible to display a receiving message of the target virtual resource in text, such as "4 flowers have been given to YY".

In some embodiments, the terminal may dismiss the target team as follows: presenting a dismissing function item corresponding to the target team; and dismissing the target team in response to a trigger operation for the dismissing function item, and presenting dismissing prompt information used for prompting that the target team has been dismissed.

Here, the terminal may also present a dismissing function item for the target team, and the creator of the target team can dismiss the target team through the dismissing function item. When receiving a trigger operation for the dismissing function item, the terminal dismisses the target team in response to the trigger operation, and presents dismissing prompt information used for prompting that the target team has been dismissed. In practical applications, the dismissing prompt information may be displayed on the terminal interface of the team creator of the target team, and may also be displayed on the terminal interfaces of other team members in the target team. Moreover, since the team members have transmitted target virtual resources to the creator when joining the target team, the target virtual resources may be returned to the team members when the target team is dismissed.

Figure 16:
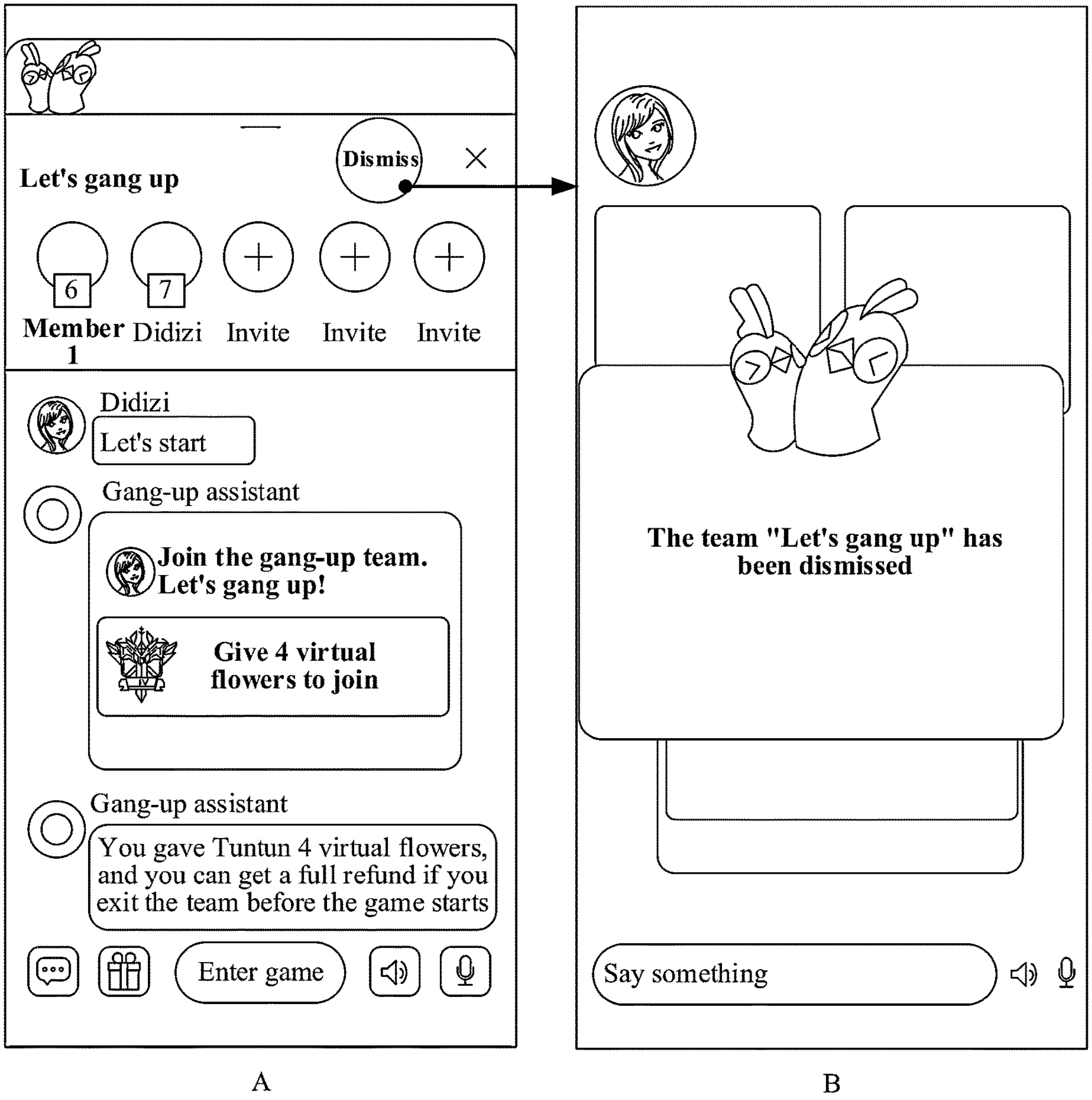
FIG. 16 is a schematic diagram of a target team dismissing process according to embodiments of this disclosure.

As an example, with reference to FIG. 16, FIG. 16 is a schematic diagram of a target team dismissing process according to embodiments of this disclosure. Here, the terminal presents a dismissing function item "Dismiss" corresponding to a target team "Let's gang up", as shown in figure A in FIG. 16. The target team is dismissed in response to a trigger operation for the dismissing function item "Dismiss", and dismissing prompt information "The team 'Let's gang up' has been dismissed" used for prompting that the target team has been dismissed is presented, as shown in figure B in FIG. 16.

In some embodiments, the terminal may present exit prompt information when an exit instruction for the target team triggered by a target member in the target team is received. The exit prompt information is used for prompting that the target member has exited the target team.

Here, the terminal may present exit prompt information when the terminal receives an exit instruction for the target team triggered by a target member in the target team. The exit prompt information is used for prompting that the target member has exited the target team. In practical applications, the exit prompt information may be displayed on the terminal interface of the team creator of the target team to prompt the team creator that the target member has exited the target team, and may also be displayed on the terminal interfaces of other team members in the target team to prompt the other members that the target member has exited the target team. Moreover, since the target member has transmitted a target virtual resource to the creator when joining the target team, the target virtual resource may be returned to the target member when the target team is dismissed.

In some embodiments, in the terminal interfaces of team members joining the target team, there may be an exit function item corresponding to the target team. When a trigger operation of a target member for the exit function item is received, the target member is controlled to exit the target team, and exit prompt information is presented on the terminal interface of the target member. Moreover, the exit prompt information can also be synchronized to other members of the target team (including the team creator), so as to prompt that the target member has exited the target team based on the exit prompt information.

Figure 17:
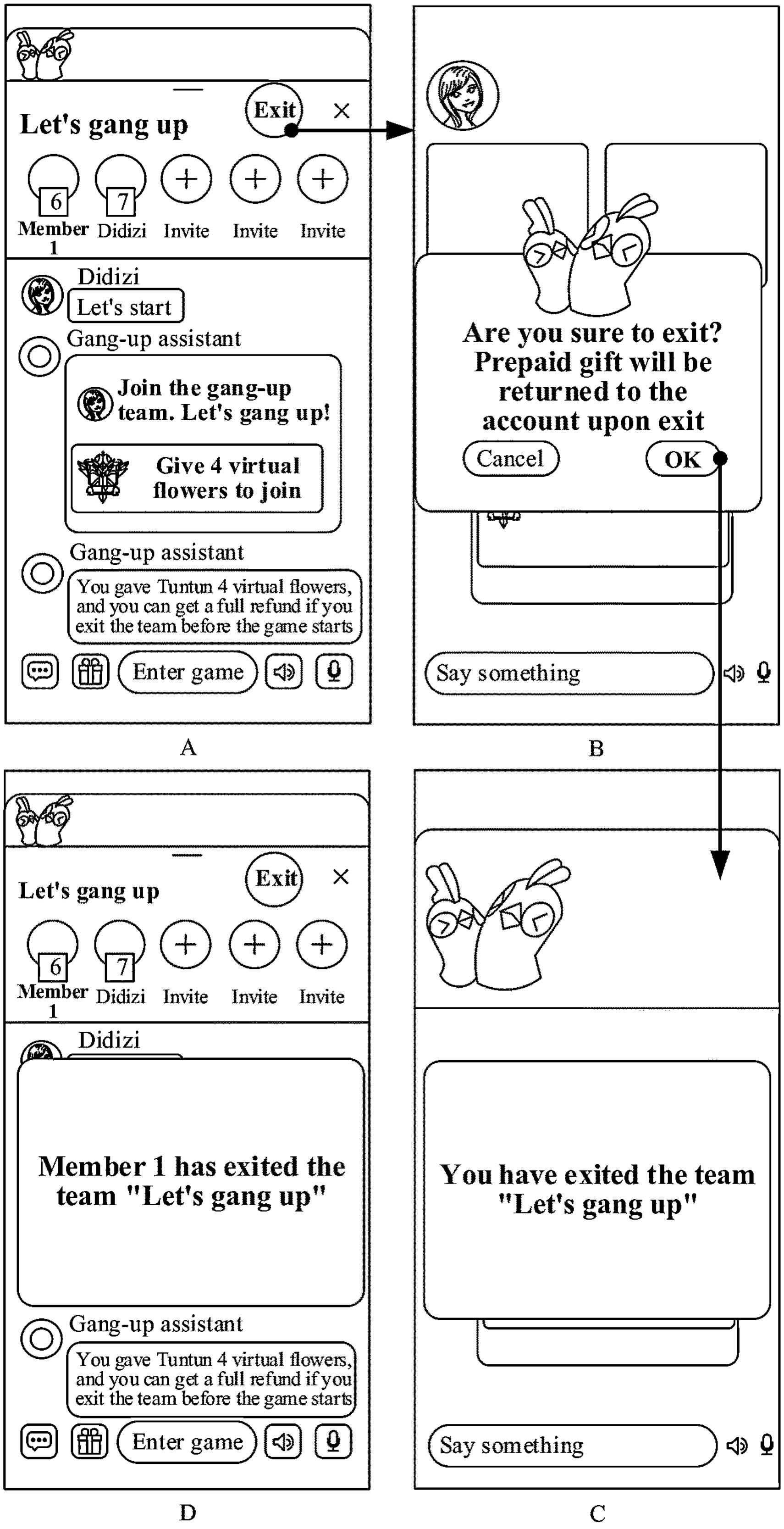
FIG. 17 is a schematic diagram of a target team exit process according to embodiments of this disclosure.

As an example, with reference to FIG. 17, FIG. 17 is a schematic diagram of a target team exit process according to embodiments of this disclosure. Here, in the terminal interface of a team member "Member 1" joining the target team, an exit function item "Exit" corresponding to a target team "Let's gang up" is presented, as shown in figure A in FIG. 17. In response to a trigger operation of "Member 1" for the exit function item, prompt information "Are you sure to exit? Prepaid gift will be returned to the account upon exit" used for prompting whether to exit is presented, as shown in figure B in FIG. 17. When receiving an exit confirmation instruction triggered based on the prompt information, "Member 1" is controlled to exit the target team, and exit prompt information "You have exited the team 'Let's gang up" is presented on the terminal interface of "Member 1", as shown in figure C in FIG. 17. Moreover, exit prompt information "Member 1 has exited the team 'Let's gang up" may be synchronized to other members of the target team (including the team creator), so as to prompt that the target member has exited the target team based on the exit prompt information, for example, figure D in FIG. 17 shows the exit prompt information on the terminal interface of the team creator.

By applying the foregoing embodiments of this disclosure, when receiving a creation instruction for a target team in a virtual scene, a team creation interface including at least one virtual resource is presented; in response to a selection operation for a target virtual resource, the target virtual resource is determined as a joining condition for joining the target team, the joining condition being used for indicating that upon receiving of a transmitted target virtual resource, it is determined that a corresponding transmitting object is a member of the target team; and the target team is created when a confirmation instruction triggered based on the target virtual resource is received.

In this way, first, based on the created target team, it is possible to interact in the virtual scene, and team-up and interaction in the virtual scene can be implemented without adding friends, thereby improving the efficiency of human-computer interaction and saving processing resources. Second, the team creator can customize the joining condition for joining the target team by selecting a displayed virtual resource, which not only makes setting of the team joining condition more diverse, but also facilitates implementation and improves processing efficiency.

Figure 18:
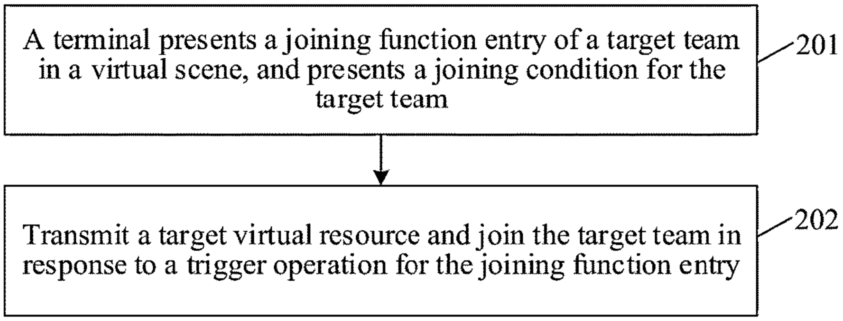
FIG. 18 is a schematic flowchart of a method for joining a team in a virtual scene according to embodiments of this disclosure.

A method for joining a team in a virtual scene according to embodiments of this disclosure will be described below. In some embodiments, the method for joining a team in a virtual scene according to the embodiments of this disclosure may be implemented independently by a server or a terminal, or implemented jointly by a server and a terminal. The method for joining a team in a virtual scene according to the embodiments of this disclosure will be described below by taking implementation by a terminal as an example. With reference to FIG. 18, FIG. 18 is a schematic flowchart of a method for joining a team in a virtual scene according to embodiments of this disclosure. The method for joining a team in a virtual scene according to embodiments of this disclosure includes the following steps.

Step 201: A terminal presents a joining function entry of a target team in a virtual scene, and presents a joining condition for the target team.

The joining condition is used for indicating that upon transmitting of a target virtual resource to a creation object of the target team, it is determined that a corresponding transmitting object is a member of the target team.

Here, a client that supports team creation in a virtual scene is installed on the terminal. The client may be a client that supports a virtual scene (such as a game client), or a client integrated with a function of creating a team in a virtual scene (such as an instant messaging client, a live streaming client, and a team-up client). When a user opens the client on the terminal and the terminal runs the client, the user can create a target team in a virtual scene on the client. The target team is used for members in the target team to interact in the virtual scene, for example, for the members of the target team to play games.

When the terminal completes creation of a target team in a virtual scene based on the method for creating a team in a virtual scene according to the forgoing embodiments, the terminal presents a joining function entry corresponding to the target team in the virtual scene, and presents a joining condition corresponding to the target team. The joining condition is used for indicating that upon transmitting of a target virtual resource to a creation object corresponding to the target team, it is determined that a corresponding transmitting object is a member of the target team. For example, the joining condition may be "Give 4 virtual flowers to join".

In practical applications, the joining function entry corresponding to the target team may be team joining invitation information, such as team joining invitation information "Let's gang up!", or may be a joining function item corresponding to the target team, such as a joining button. Moreover, a corresponding joining condition is presented, for example, "Give 4 virtual flowers to join".

Step 202: Transmit a target virtual resource and join the target team in response to a trigger operation for the joining function entry.

In practical applications, the user performs a trigger operation (such as single click, double click, and press and hold) on the joining function entry to transmit a target virtual resource. In some embodiments, when the terminal receives a trigger operation for the joining function entry, it directly transmits a target virtual resource to join the target team. In some other embodiments, when a trigger operation for the joining function entry is received, prompt information used for prompting whether to transmit a target virtual resource is presented in response to the trigger operation. In practical applications, the prompt information may also correspond to an "OK" button used for triggering a transmitting confirmation instruction, and a "Cancel" button used for triggering a transmitting cancellation instruction, so as to make it convenient for the user to perform corresponding processing based on the prompt information, i.e., confirming whether to transmit the target virtual resource.

Here, when a transmitting confirmation instruction is received based on the prompt information, the target virtual resource is transmitted to the creation object corresponding to the target team; and the target team joined, for members of the target team to interact in the virtual scene in the form of the team, for example, for the members of the target team to play games.

Figure 19:
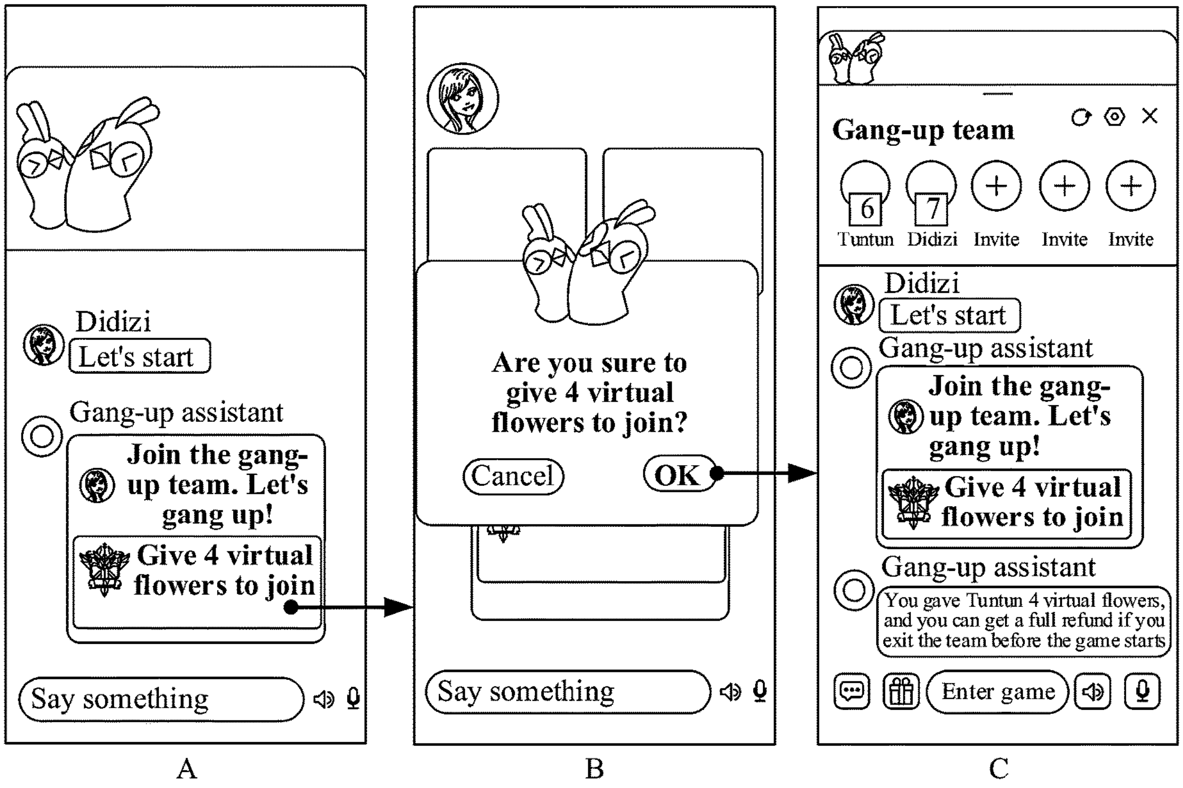
FIG. 19 is a schematic diagram of a process of joining a target team in a virtual scene according to embodiments of this disclosure.

As an example, with reference to FIG. 19, FIG. 19 is a schematic diagram of a process of joining a target team in a virtual scene according to embodiments of this disclosure. Here, the terminal presents a joining function entry of a target team in a virtual scene, where the joining function entry of the target team may be team joining invitation information, such as team joining invitation information "Join a gang-up team. Let's gang up!", and the terminal presents a joining condition "Give 4 virtual flowers to join" corresponding to the target team, as shown in figure A in FIG. 19. In response to a trigger operation for the joining function entry, prompt information "Are you sure to give 4 virtual flowers to join?" used for prompting whether to transmit a target virtual resource, a corresponding "OK" button used for triggering a transmitting confirmation instruction, and a corresponding "Cancel" button used for triggering a transmitting cancellation instruction are presented, as shown in figure B in FIG. 19. When a transmitting confirmation instruction is received based on the prompt information, the target virtual resource is transmitted to join the target team, and my team "Gang-up team" is presented at this time, as shown in figure C in FIG. 19.

By applying the foregoing embodiments of this disclosure, when receiving a creation instruction for a target team in a virtual scene, a team creation interface including at least one virtual resource is presented; in response to a selection operation for a target virtual resource, the target virtual resource is determined as a joining condition for joining the target team, the joining condition being used for indicating that upon receiving of a transmitted target virtual resource, it is determined that a corresponding transmitting object is a member of the target team; and the target team is created when a confirmation instruction triggered based on the target virtual resource is received.

In this way, first, based on the created target team, it is possible to interact in the virtual scene, and team-up and interaction in the virtual scene can be implemented without adding friends, thereby improving the efficiency of human-computer interaction and saving processing resources. Second, the team creator can customize the joining condition for joining the target team by selecting a displayed virtual resource, which not only makes setting of the team joining condition more diverse, but also facilitates implementation and improves processing efficiency.

Exemplary application of the embodiments of this disclosure in a practical application scenario is described below by taking the virtual scene being a game scene as an example.

Terms involved in the embodiments of this disclosure are explained as follows:

1) gang-up in games: it is a game term, and refers to voice or face-to-face communication when playing games.
2) Gift donation: it refers to a process in which virtual gifts are given between users on the network, and corresponding effects are displayed after the gifts are given.

In related art, when creating a team for interaction in a virtual scene, team-up needs to be implemented by adding friends in a virtual scene client. The process is complicated, and the efficiency of human-computer interaction is low. Moreover, the joining condition for the formed team is fixed and single (for example, transmitting a joining request and waiting for approval to join) and a team creator cannot customize the joining condition.

Based on this, the embodiments of this disclosure provide a method for creating a team in a virtual scene and a method for joining a team in a virtual scene to at least solve the above problems. In some embodiments, a user is supported to set a joining condition for other members when creating a game team (i.e., giving a virtual resource to the creator to join the team), based on a game team-up tool and game data connection capability of a platform (such as a platform that supports creation of a game team) in combination with a virtual resource (such as a virtual gift) donation capability. In practical applications, after team members join the team, the background will freeze the virtual resources, and when the end of the game battle, complete a virtual resource giving or virtual resource return process according to the result of the game battle.

In this way, game account data and team-up platform data are connected, and members of the created team can be directly pulled into the same team in the game without adding user game friends, thereby simplifying operation and improving the processing efficiency. In addition, when creating a team, the team creator can customize the threshold for other users to join the team, and customize the number of virtual gifts that need to be given and the content of virtual gifts, making the configuration more flexible.

Next, the method for creating a team in a virtual scene and the method for joining a team in a virtual scene according to the embodiments of this disclosure will be described from the product side.

First, creation of a gift team (i.e., the aforementioned target team).

1) A team-up platform obtains a user's account and role information in a game platform through the user's login status (such as an instant messaging client account).
2) In a pre-created group (such as a live streaming studio and a group chat), a user can directionally initiate game team-up to a certain user in the group from the user's data card. In some embodiments, a "Team up" button on the data card can be clicked on to trigger a creation instruction for a target team. The user can also trigger a creation instruction for a target team at a team-up entry "Create team" of the group.
3) With reference to FIG. 8 to FIG. 10, when receiving the creation instruction for the target team, a joining condition about whether a member needs to give a gift to join the target team can be set in a team creation interface. When a joining condition setting function is enabled, a target virtual resource and a corresponding target quantity are selected in a presented virtual resource (that is, virtual gift) list, and then a "Create now" button is clicked on to complete creation of the target team.
4) After the user clicks on "Create now" to create the target team, team joining invitation information "Let's gang up" will be transmitted to a chat area of the room, and can be seen by users in the room, as shown in figure C in FIG. 7. With continuing reference to FIG. 11, for the team creator, a "Start game" button is presented, as shown in figure A in FIG. 11, for the creator to start a game of the target team, and then a game APP is entered, as shown in figure A in FIG. 11. The team creator can return to the team-up platform to view while waiting for other users to join after starting the game. At this time, an "Enter game" (as shown in figure C in FIG. 11) button can also be clicked on to enter the game APP again. When the game interaction ends, the team-up platform is returned again, and the team-up platform displays the interaction result, virtual resource giving effects and messages, etc., as shown in FIG. 15.

Here, as shown in FIG. 12, the "Start game" button is displayed in the floating window. Moreover, member information of the target team is also displayed in the floating window, such as member avatars, and the user can click on a member avatar to view the corresponding user's data. Moreover, collapse and expansion instructions for the floating window may also be triggered to collapse and expand the floating window.

5) With reference to FIG. 13 and FIG. 14, a removal function for members in the target team is also provided. When a removal instruction for a member is received, prompt information used for prompting whether to remove the member is presented, and the member is removed from the target team when a removal confirmation instruction triggered based on the prompt information is received.

Second, join the gift team (i.e., the target team) and complete a game interaction battle.

1) As shown in FIG. 19, when another user joins the target team, the user is prompted to give a virtual resource according to the joining condition for the target team. After successfully given, the gift is frozen and bound in the target team, and the user is automatically added to the chat room of the target team on the platform. The creator initiates "Start game" from the chat room, and the members are pulled into the same team-up room in the game and start the game interaction battle.

2) After the game interaction battle ends, the virtual gift frozen in the target team will be automatically given to the team creator, and the giving effect and giving message will be displayed in the team chat room, as shown in FIG. 15.

3) If the gift team does not complete the battle and a user exits the team midway, the frozen gift is automatically returned to the team member, and exit prompt information is presented, as shown in FIG. 17.

4) When the team creator dismisses the target team, dismissing prompt information of the target team is displayed, as shown in FIG. 16, target virtual gifts of members who joined the target team are returned to the corresponding members.

Next, the method for creating a team in a virtual scene and the method for joining a team in a virtual scene according to the embodiments of this disclosure will be described from the technical side, including:

First, create a gift team.

1) The creation qualification for a game character bound to user uid_1 is determined according to an established rule during creation.

2) If the creation qualification is met, a team creation page is called. The creation page supports configuration of a team attribute and a joining threshold, and supports setting whether to enable teammate joining with gift. After enabling, the terminal requests the background to pull an exemplary gift list.

3) Creation is completed by a click, then the content of creation settings is passed to the background, and the background automatically generates team id_1, and sets a binding association qualification determining parameter according to the settings.

Second, give a gift to join the gift team.

1) user uid_2 triggers to join team id_1. The terminal transmits the user game account and team id to the background. The background queries the bound game character according to uid_2, if a condition of team id_1 is met, determines whether team id_1 is a gift team, and if it is a gift team, notifies the terminal to display required gift content and quantity by a pop-up prompt.

2) The user performs selection for give-away. The terminal requests the background to perform a deduction process. The background determines the account balance based on uid_2, if the balance is greater than or equal to a gift price requirement, deducts the balance to generate order num_1 the status of which is being in-progress and associated with team id_1, binds uid_1 to team id_1, and notifies the terminal of the successful joining. The terminal calls a team chat room of id_1. If it is determined that the balance is insufficient, the terminal is notified of an error, and the terminal calls a recharge process.

Third, complete gift giving.

1) A user in the team triggers a request to enter the game. The background determines whether the team has been associated with a room id in the game, if no, calls a game interface to obtain game room id_3, combines id_3 and team user id information into a URL, and transmits same to the terminal. The terminal calls a game client through the URL. The game client loads users in the game room corresponding to id_3 according to a protocol. Thus, the process of delivering the team to the game is simplified.

2) After the game battle ends, the background is notified to change the status of team id_1. The background changes the status of order num_1 while changing the status of the team, completes the order to increase the gift income in the account of user uid_2, and pushes the giving effect and message to the terminal chat room for display.

Figure 20:
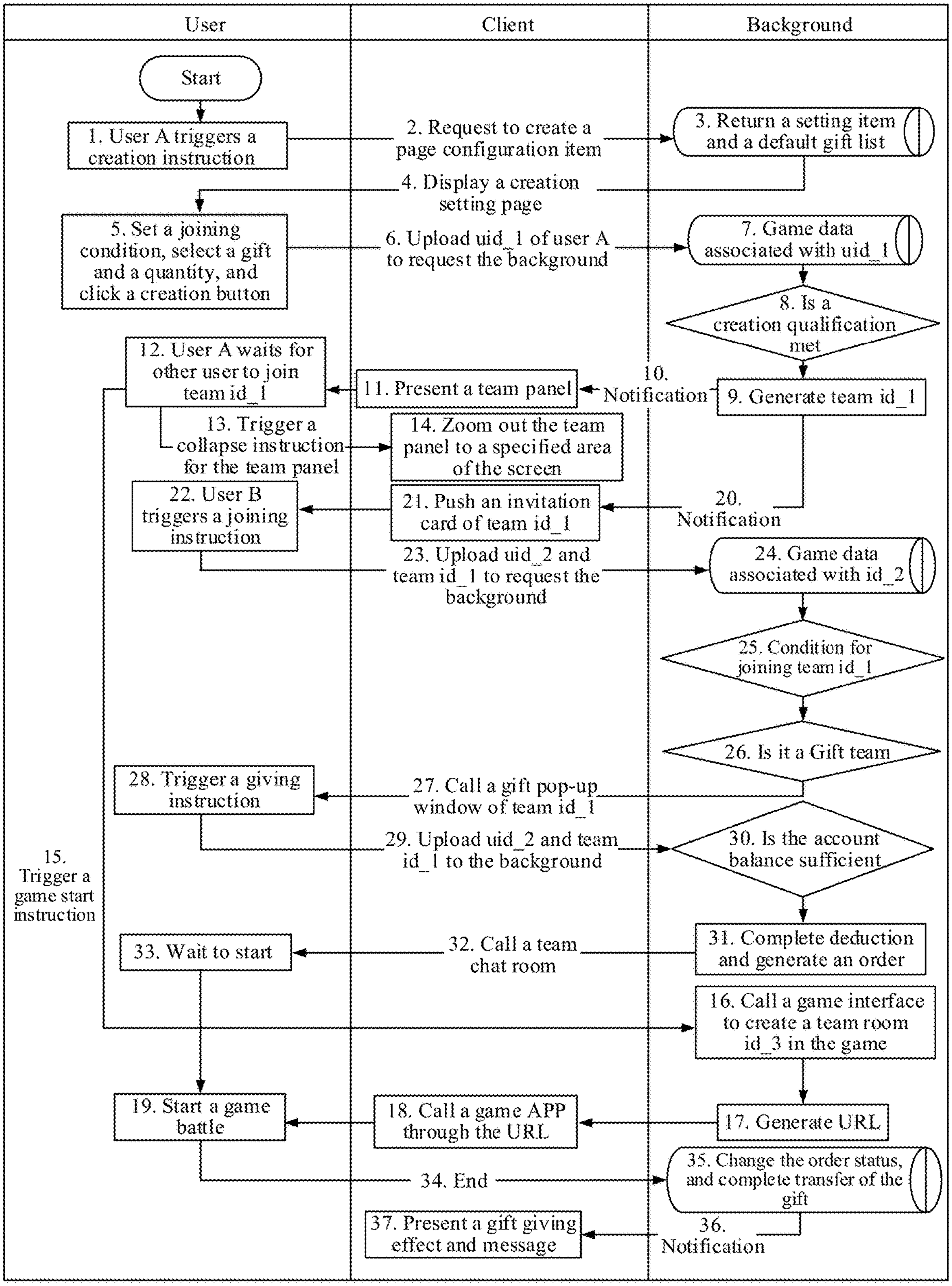
FIG. 20 is a schematic flowchart of a method for creating a team in a virtual scene and a method for joining a team in a virtual scene according to embodiments of this disclosure.

In some embodiments, with reference to FIG. 20, FIG. 20 is a schematic flowchart of a method for creating a team in a virtual scene and a method for joining a team in a virtual scene according to embodiments of this disclosure, including the following steps.

Step 1: User A triggers a creation instruction for a target team on a first client.

Here, the first client corresponds to user A, the second client corresponds to user B, and both are integrated with a function of creating a team for a virtual scene.

Step 2: The first client requests a background to create a page configuration item.

Step 3: The background returns a setting item and a default gift list to the first client.

Step 4: The first client displays a creation setting page.

Here, the creation setting interface may include the setting item returned by the background, the default gift list, and the like.

Step 5: User A sets a joining condition on the first client, that is, selects a gift and a quantity, and clicks a creation button.

Step 6: The first client uploads uid_1 of user A to the background to request to create a target team.

Step 7: The background searches for game data associated with uid_1.

Step 8: The background determines whether user A corresponding to uid_1 meets a team creation qualification.

Step 9: The background creates team id_1 (that is, the target team).

Step 10: The background returns a notification that the target team is created successfully to the first client.

Step 11: The first client presents a team panel of the target team.

Step 12: User A waits for another user B to join the target team.

Step 13: User A triggers a collapse instruction for the team panel on the first client.

Step 14: The first client zooms out the team panel to a specified area of the screen.

Step 15: User A triggers a game start instruction on the first client, and the first client transmits the game start instruction to the background.

Step 16: The background calls a game interface to create a team room id_3 in the game.

Step 17: The background generates URL corresponding to the team room and returns same to the first client.

Step 18: The first client calls a game client through the URL.

Step 19: User A triggers an instruction for starting a game battle on the game client.

Step 20: The background returns a notification that the target team is created successfully to a second client.

Step 21: The second client pushes an invitation card of target team id_1.

Step 22: User B clicks on the invitation card to trigger a joining instruction for the target team.

Step 23: The second client uploads uid_2 of user B and target team id_1 to the background.

Step 24: The background queries game data associated with id_2.

Step 25: The background queries a joining condition for joining team id_1.

Step 26: The background determines whether team id_1 is a gift team, and if yes, returns a message that team id_1 is a gift team to the second client.

Step 27: The second client calls a gift pop-up window of team id_1.

Step 28: User B triggers a gift giving instruction on the second client.

Step 29: The second client uploads uid_2 of user B and team id_1 to the background.

Step 30: The background determines whether the account balance of user B is sufficient, and if yes, performs step 31.

Step 31: The background completes corresponding deduction of the given gift and generates an order.

Step 32: The second client calls a chat room corresponding to the target team for user B.

Step 33: User B waits for user A to start a game battle.

Step 34: The first client and the second client return game interaction battle end notifications to the background.

Step 35: The background changes the order status, and completes transfer of the gift to the account of user A.

Step 36: The background transmits a gift receiving notification to the first client.

Step 37: The first client presents a gift giving effect and message.

By means of the foregoing embodiments of this disclosure, members joining the created team can be directly pulled into the same team in the game scene without adding user game friends, thereby simplifying operation and improving the processing efficiency. In addition, when creating a team, the team creator can customize the threshold for other users to join the team, and customize the number of virtual gifts that need to be given and the content of virtual gifts, making the configuration more flexible, and stimulating the team creator (such as a game anchor) to improve the service quality.

The following continues to describe the exemplary structure of an apparatus 555 for creating a team in a virtual scene according to the embodiments of this disclosure implemented as software modules. In some embodiments, as shown in FIG. 2, software modules of the apparatus 555 for creating a team in a virtual scene stored in a memory 550 may include:

a first presentation module 5551 configured to present at least one virtual resource for selection in a team creation interface in response to a creation instruction for a target team in a virtual scene;

a determining module 5552 configured to determine, in response to a selection operation for a target virtual resource, the target virtual resource as a joining condition for joining the target team, the joining condition being used for indicating that upon receiving of a transmitted target virtual resource, it is determined that a corresponding transmitting object is a member of the target team; and a creating module 5553 configured to create the target team in response to a confirmation instruction triggered based on the joining condition.

In some embodiments, the first presentation module 5551 is further configured to: present a first team creation entry of at least one candidate virtual scene, the at least one candidate virtual scene including the virtual scene; and receive the creation instruction for the target team in the virtual scene in response to a trigger operation for the first team creation entry of the virtual scene.

In some embodiments, the first presentation module 5551 is further configured to: present a second team creation entry of the virtual scene;

present at least one candidate object for selection in response to a trigger operation for the second team creation entry; and receive, in response to a selection confirmation operation for a target candidate object, the creation instruction for the target team corresponding to the target candidate object in the virtual scene.

In some embodiments, the first presentation module 5551 is further configured to: present a third team creation entry in a data card interface of a target object;

receive the creation instruction for the target team in the virtual scene in response to a trigger operation for the third team creation entry; and transmit team-up invitation information to the target object, the team-up invitation information being used for inviting the target object to join the target team.

In some embodiments, the first presentation module 5551 is further configured to: create a group corresponding to the virtual scene, and present a fourth team creation entry in a group interface of the group; and receive the creation instruction for the target team in the virtual scene in response to a trigger operation for the fourth team creation entry.

In some embodiments, the first presentation module 5551 is further configured to: create the group corresponding to the virtual scene in a client interface other than an application of the virtual scene;

the group including at least one object other than a current object, and the object and the current object having a social association relationship in the application.

In some embodiments, the first presentation module 5551 is further configured to: present a conversation interface of the group; and transmit and present team joining invitation information of the target team in the conversation interface of the group;

the team joining invitation information being used for inviting an object in the group to join the target team.

In some embodiments, the first presentation module 5551 is further configured to: present a condition setting function switch; and enable a joining condition setting function for the target team in response to a trigger operation for the condition setting function switch.

The first presentation module 5551 is further configured to: present at least one virtual resource for selection in a team creation interface when the joining condition setting function for the target team is enabled.

In some embodiments, the first presentation module 5551 is further configured to: present a condition setting function switch corresponding to the target team in the team creation interface; or present the condition setting function switch in a setting interface of the virtual scene.

In some embodiments, the determining module 5552 is further configured to: present a quantity setting function item corresponding to the target virtual resource in response to the selection operation for the target virtual resource in the at least one virtual resource;

receive a target quantity set for the target virtual resource based on the quantity setting function item; and determine the target quantity of target virtual resources as a joining condition for joining the target team.

In some embodiments, the first presentation module 5551 is further configured to: present an enabling function entry of the virtual scene;

present a scene entry interface of the virtual scene in response to a trigger operation for the enabling function entry; and control members joining the target team to enter the virtual scene when a virtual scene entry instruction triggered based on the scene entry interface is received.

In some embodiments, the first presentation module 5551 is further configured to present the enabling function entry of the virtual scene through a floating window.

The first presentation module 5551 is further configured to: present a collapse function item for the floating window; and collapse the floating window to a floating window expansion function item when a trigger operation for the collapse function item is received;

the floating window expansion function item being used for expanding the floating window when a floating window expansion instruction triggered based on the floating window expansion function item is received, and present the enabling function entry again.

In some embodiments, the first presentation module 5551 is further configured to: perform interface return to an interface corresponding to the enabling function entry before controlling the members joining the target team to enter the virtual scene and when an interface return operation for the scene entry interface is received;

present an entry function item of the virtual scene in the interface corresponding to the enabling function entry; and present the scene entry interface again when a trigger operation for the entry function item is received.

In some embodiments, the first presentation module 5551 is further configured to: present a removal function item corresponding to a member in the target team;

present, in response to a trigger operation for the removal function item, prompt information used for prompting whether to remove the member from the target team; and remove the member from the target team in response to a removal confirmation instruction triggered based on the prompt information, and return the target virtual resource to the member.

In some embodiments, the first presentation module 5551 is further configured to: present an interaction result corresponding to the virtual scene when interaction between members of the target team in the virtual scene ends; and output a receiving and display process corresponding to the target virtual resource.

In some embodiments, the first presentation module 5551 is further configured to: present a dismissing function item corresponding to the target team; and dismiss the target team in response to a trigger operation for the dismissing function item, and present dismissing prompt information used for prompting that the target team has been dismissed.

In some embodiments, the first presentation module 5551 is further configured to: present exit prompt information when an exit instruction for the target team triggered by a target member in the target team is received;

the exit prompt information being used for prompting that the target member has exited the target team.

In some embodiments, the first presentation module 5551 is further configured to: dismiss the target team in response to a trigger operation for the dismissing function item, and present dismissing prompt information used for prompting that the target team has been dismissed.

In some embodiments, the first presentation module 5551 is further configured to: present exit prompt information when an exit instruction for the target team triggered by a target member in the target team is received;

the exit prompt information being used for prompting that the target member has exited the target team.

By applying the foregoing embodiments of this disclosure, when receiving a creation instruction for a target team in a virtual scene, a team creation interface including at least one virtual resource is presented; in response to a selection operation for a target virtual resource, the target virtual resource is determined as a joining condition for joining the target team, the joining condition being used for indicating that upon receiving of a transmitted target virtual resource, it is determined that a corresponding transmitting object is a member of the target team; and the target team is created when a confirmation instruction triggered based on the target virtual resource is received.

In this way, first, based on the created target team, it is possible to interact in the virtual scene, and team-up and interaction in the virtual scene can be implemented without adding friends, thereby improving the efficiency of human-computer interaction and saving processing resources. Second, the team creator can customize the joining condition for joining the target team by selecting a displayed virtual resource, which not only makes setting of the team joining condition more diverse, but also facilitates implementation and improves processing efficiency.

The following continues to describe an apparatus for joining a team in a virtual scene according to embodiments of this disclosure. The apparatus for joining a team in a virtual scene according to the embodiments of this disclosure includes:

a second presentation module configured to present a joining function entry corresponding to a target team in a virtual scene, and present a joining condition corresponding to the target team, the joining condition being used for indicating that upon transmitting of a target virtual resource to a creation object corresponding to the target team, it is determined that a corresponding transmitting object is a member of the target team; and a joining module configured to transmit the target virtual resource and join the target team in response to a trigger operation for the joining function entry.

In some embodiments, the apparatus further includes a third presentation module, configured to present prompt information used for prompting whether to transmit the target virtual resource in response to a trigger operation for the joining function entry.

The joining module is further configured to transmit the target virtual resource and join the target team when a transmitting confirmation instruction is received based on the prompt information.

By applying the foregoing embodiments of this disclosure, when receiving a creation instruction for a target team in a virtual scene, a team creation interface including at least one virtual resource is presented; in response to a selection operation for a target virtual resource, the target virtual resource is determined as a joining condition for joining the target team, the joining condition being used for indicating that upon receiving of a transmitted target virtual resource, it is determined that a corresponding transmitting object is a member of the target team; and the target team is created when a confirmation instruction triggered based on the target virtual resource is received.

In this way, first, based on the created target team, it is possible to interact in the virtual scene, and team-up and interaction in the virtual scene can be implemented without adding friends, thereby improving the efficiency of human-computer interaction and saving processing resources. Second, the team creator can customize the joining condition for joining the target team by selecting a displayed virtual resource, which not only makes setting of the team joining condition more diverse, but also facilitates implementation and improves processing efficiency.

The embodiments of this disclosure further provide an electronic device, including:

a memory configured to store an executable instruction; and a processor configured to implement the method according to the embodiments of this disclosure when executing the executable instruction stored in the memory.

The embodiments of this disclosure further provide a computer program product or a computer program, the computer program product or the computer program including a computer instruction stored in a computer-readable storage medium. A processor of a computer device reads the computer instruction from the computer-readable storage medium, and the processor executes the computer instruction, so that the computer device executes the method according to the embodiments of this disclosure.

The embodiments of this disclosure further provide a computer-readable storage medium, storing an executable program, the executable program being executed by a processor to implement the method according to the embodiments of this disclosure.

In some embodiments, the computer-readable storage medium may be a memory such as a Read-Only Memory (ROM), a Random Access Memory (RAM), an Erasable Programmable Read-Only Memory (EPROM), an Electrically Erasable Programmable Read-Only Memory (EEPROM), a flash memory, a magnetic surface memory, an optical disk, or a CD-ROM, and may also be a plurality of devices including one of the above memories or any combination thereof.

In some embodiments, the executable instruction may be written in the form of program, software, software module, script, or code in any form of programming language (including compilation or interpretation language, or declarative or procedural language), and the executable instruction may be deployed in any form, including being deployed as an independent program or being deployed as a module, component, subroutine, or other units suitable for use in a computing environment.

As an example, the executable instruction may, but not necessarily, correspond to a file in a file system, and may be stored as a part of the file that stores other programs or data, for example, stored in one or more scripts in a Hyper Text Markup Language (HTML) document, stored in a single file dedicated to the program under discussion, or stored in a plurality of collaborative files (for example, a file that stores one or more modules, subroutines, or code parts).

As an example, the executable instruction may be deployed to execute on one computing device or on a plurality of computing devices located in one location, alternatively, on a plurality of computing devices distributed in a plurality of locations and interconnected through communication networks.

The foregoing descriptions are merely embodiments of this disclosure and are not intended to limit the scope of protection of this disclosure. Any modification, equivalent replacement, or improvement made without departing from the spirit and principle of this disclosure shall fall within the scope of protection of this disclosure.

What is claimed is:

1. A method for creating a team in a virtual scene, executed by an electronic device, and comprising:

presenting at least one virtual resource for selection in a team creation interface in response to a creation instruction for a target team in a virtual scene;

determining, in response to a selection operation for a target virtual resource, the target virtual resource as a joining condition for joining the target team, the joining condition being for indicating that upon receiving a transmitted target virtual resource, a corresponding transmitting object being determined to be a member of the target team;

creating the target team in response to a confirmation instruction triggered based on the joining condition; and presenting exit prompt information in response to an exit instruction for the target team triggered by a target member in the target team being received, the exit prompt information being for prompting that the target member has exited the target team.

2. The method according to claim 1, further comprising:

presenting a first team creation entry of at least one candidate virtual scene, the at least one candidate virtual scene comprising the virtual scene; and receiving the creation instruction in response to a trigger operation for the first team creation entry of the virtual scene.

3. The method according to claim 1, further comprising:

presenting a second team creation entry of the virtual scene;

presenting at least one candidate object for selection in response to a trigger operation for the second team creation entry; and receiving, in response to a selection confirmation operation for a target candidate object, a creation instruction for a target team corresponding to the target candidate object.

4. The method according to claim 1, further comprising:

presenting a third team creation entry in a data card interface of a target object;

receiving a creation instruction for the target team in the virtual scene in response to a trigger operation for the third team creation entry; and transmitting team-up invitation information to the target object, the team-up invitation information being for inviting the target object to join the target team.

5. The method according to claim 1, further comprising:

creating a group corresponding to the virtual scene, and presenting a fourth team creation entry in a group interface of the group; and receiving a creation instruction for the target team in the virtual scene in response to a trigger operation for the fourth team creation entry.

6. The method according to claim 5, wherein the creating the group corresponding to the virtual scene comprises:

creating the group corresponding to the virtual scene in a client interface other than an application of the virtual scene, the group comprising at least one object other than a current object, and the object and the current object having a social association relationship in the application.

7. The method according to claim 5, wherein the method further comprises:

presenting a conversation interface of the group; and presenting team joining invitation information corresponding to the target team in the conversation interface of the group, the team joining invitation information being for inviting an object in the group to join the target team.

8. The method according to claim 1, wherein the method further comprises:

presenting a condition setting function switch; and enabling a joining condition setting function for the target team in response to a trigger operation for the condition setting function switch; and the presenting at least one virtual resource for selection comprises:

presenting the at least one virtual resource for selection in response to the joining condition setting function for the target team being enabled.

9. The method according to claim 8, wherein the presenting the condition setting function switch comprises:

presenting a condition setting function switch for the target team in the team creation interface of the target team.

10. The method according to claim 8, wherein the presenting the condition setting function switch comprises:

presenting the condition setting function switch in a setting interface of the virtual scene.

11. The method according to claim 1, wherein the determining the target virtual resource as the joining condition for joining the target team comprises:

presenting a quantity setting function item for the target virtual resource in response to the selection operation for the target virtual resource;

receiving a target quantity set for the target virtual resource based on the quantity setting function item; and determining the target quantity of target virtual resources as a joining condition for joining the target team.

12. The method according to claim 1, wherein the method further comprises:

presenting an enabling function entry of the virtual scene;

presenting a scene entry interface of the virtual scene in response to a trigger operation for the enabling function entry; and controlling members joining the target team to enter the virtual scene based on the scene entry interface when a virtual scene entry instruction is received.

13. The method according to claim 12, wherein the presenting the enabling function entry of the virtual scene comprises:

presenting the enabling function entry of the virtual scene through a floating window; and the method further comprises:

presenting a collapse function item for the floating window; and collapsing the floating window to a floating window expansion function item in response to a trigger operation for the collapse function item being received, the floating window expansion function item being for expanding the floating window in response to a floating window expansion instruction triggered based on the floating window expansion function item being received, and presenting the enabling function entry again.

14. The method according to claim 12, further comprising:

performing interface return to an interface corresponding to the enabling function entry before controlling the members joining the target team to enter the virtual scene and in response to an interface return operation for the scene entry interface being received;

presenting an entry function item of the virtual scene in the interface corresponding to the enabling function entry; and presenting the scene entry interface again in response to a trigger operation for the entry function item being received.

15. The method according to claim 1, wherein the method further comprises:

presenting a removal function item for a member in the target team;

presenting, in response to a trigger operation for the removal function item, prompt information for prompting whether to remove the member from the target team; and removing the member from the target team in response to a removal confirmation instruction triggered based on the prompt information, and returning the target virtual resource to the member.

16. The method according to claim 1, further comprising:

presenting an interaction result of the virtual scene in response to interaction between members of the target team in the virtual scene ending; and outputting a receiving and display process of the target virtual resource.

17. The method according to claim 1, wherein the method further comprises:

presenting a dismissing function item corresponding to the target team; and dismissing the target team in response to a trigger operation for the dismissing function item, and presenting dismissing prompt information for prompting that the target team has been dismissed.

18. A method for joining a team in a virtual scene, executed by an electronic device, and comprising:

presenting a joining function entry of a target team in a virtual scene, and presenting a joining condition for the target team, the joining condition being for indicating that upon transmitting a target virtual resource to a creation object of the target team, a corresponding transmitting object being determined to be a member of the target team;

transmitting the target virtual resource and joining the target team in response to a trigger operation for the joining function entry; and presenting exit prompt information in response to an exit instruction for the target team triggered by a target member in the target team being received, the exit prompt information being for prompting that the target member has exited the target team.

19. An apparatus for creating a team in a virtual scene, comprising:

a memory operable to store computer-readable instructions; and a processor circuitry operable to read the computer-readable instructions, the processor circuitry when executing the computer-readable instructions is configured to:

present at least one virtual resource for selection in a team creation interface in response to a creation instruction for a target team in a virtual scene;

determine, in response to a selection operation for a target virtual resource, the target virtual resource as a joining condition for joining the target team, the joining condition being for indicating that upon receiving a transmitted target virtual resource, a corresponding transmitting object being determined to be a member of the target team;

create the target team in response to a confirmation instruction triggered based on the joining condition; and present exit prompt information in response to an exit instruction for the target team triggered by a target member in the target team being received, the exit prompt information being for prompting that the target member has exited the target team.

* * * * *